(12) United States Patent
Wu et al.

(10) Patent No.: US 11,405,160 B2
(45) Date of Patent: Aug. 2, 2022

(54) METHOD AND DEVICE IN COMMUNICATION NODE USED FOR WIRELESS COMMUNICATION

(71) Applicants: Keying Wu, Shanghai (CN); Xiaobo Zhang, Shanghai (CN)

(72) Inventors: Keying Wu, Shanghai (CN); Xiaobo Zhang, Shanghai (CN)

(73) Assignee: SHANGHAI LANGBO COMMUNICATION TECHNOLOGY COMPANY LIMITED, Shanghai (CN)

( * ) Notice: Subject to any disclaimer, the term of this patent is extended or adjusted under 35 U.S.C. 154(b) by 201 days.

(21) Appl. No.: 16/924,224

(22) Filed: Jul. 9, 2020

(65) Prior Publication Data

US 2021/0021395 A1    Jan. 21, 2021

(30) Foreign Application Priority Data

Jul. 19, 2019   (CN) .......................... 201910656589.3
May 30, 2020   (CN) .......................... 202010480724.6

(51) Int. Cl.
  *H04W 4/00*   (2018.01)
  *H04L 5/00*   (2006.01)
  *H04L 1/18*   (2006.01)
  *H04W 72/04*  (2009.01)

(52) U.S. Cl.
  CPC .......... *H04L 5/0055* (2013.01); *H04L 1/1854* (2013.01); *H04W 72/042* (2013.01)

(58) Field of Classification Search
  CPC .......... H04L 5/0055; H04L 2001/0092; H04L 1/1854; H04W 72/042

USPC ......................................................... 370/329
See application file for complete search history.

(56) References Cited

U.S. PATENT DOCUMENTS

| 2017/0041971 A1 | 2/2017 | Kim et al. |
| 2018/0213379 A1* | 7/2018 | Xiong ..................... H04W 4/70 |
| 2019/0342944 A1 | 11/2019 | Chatterjee |
| 2020/0029318 A1* | 1/2020 | Guo ....................... H04L 1/1819 |

(Continued)

FOREIGN PATENT DOCUMENTS

CN         109792326 A      5/2019

OTHER PUBLICATIONS

Notice of allowance received in application No. 202010480724.6 dated Apr. 6, 2022.

(Continued)

*Primary Examiner* — Mang Hang Yeung

(57) ABSTRACT

The disclosure provides a method and device in communication node used for wireless communication. A first node receives a first signaling, transmits a first bit block set in a first air interface resource block, receives a second signal in a second air interface resource block, and transmits a third signal in a third air interface resource block. The first signaling is used for determining the first air interface resource block, and the first air interface resource block is used for determining the second air interface resource block; the second signal and the third signal indicate whether the first bit block set is correctly received respectively; the first signaling indicates a first time interval. The above method simplifies the design of downlink signalings for allocation of sidelink resources and reduces signaling overheads.

20 Claims, 12 Drawing Sheets

(56) References Cited

U.S. PATENT DOCUMENTS

| | | | |
|---|---|---|---|
| 2020/0228247 A1* | 7/2020 | Guo | H04W 52/383 |
| 2020/0266936 A1* | 8/2020 | Wang | H04W 72/042 |
| 2020/0304969 A1* | 9/2020 | Basu Mallick | H04W 72/042 |
| 2020/0351855 A1* | 11/2020 | Kung | H04W 4/00 |

OTHER PUBLICATIONS

CN 1st Search Report received in application No. 202010480724.6 dated Mar. 29, 2022.
3GPP tsg_ran\wg1_rl1, Apr. 3, 2019, Intel Corporation R1-1904296 "Sidelink allocation resource design for NR V2X communication".

* cited by examiner

METHOD AND DEVICE IN COMMUNICATION NODE USED FOR WIRELESS COMMUNICATION

CROSS REFERENCE TO RELATED APPLICATIONS

This application claims the priority benefit of Chinese Patent Application No. 201910656589.3, filed on Jul. 19, 2019, and the Chinese Patent Application No. 202010480724.6, filed on May 30, 2020. The full disclosure of which is incorporated herein by reference.

BACKGROUND

Technical Field

The disclosure relates to transmission methods and devices in wireless communication systems, and in particular to a transmission method and device related to sidelink in wireless communication.

Related Art

Application scenarios of future wireless communication systems are becoming increasingly diversified, and different application scenarios have different performance requirements on systems. In order to meet different performance requirements of various application scenarios, the $3^{rd}$ Generation Partner Project (3GPP) Radio Access Network (RAN) #72 plenary decided to conduct a study of New Radio (NR) (or Fifth Generation, 5G). The Work Item (WI) of NR was approved at the 3GPP RAN #75 plenary to standardize the NR.

In view of Vehicle-to-Everything (V2X) services developing rapidly, 3GPP has also started the initiation of standards formulation and researches under NR framework. At present, 3GPP has accomplished the work of formulation of requirements orienting 5G V2X services and has written it into standards TS22.886. 3GPP defines four use case groups for 5G V2X services, including Vehicles Platnooning, Extended Sensors, Advanced Driving and Remote Driving. The technical research of NR V2X was started at the 3GPP RAN #80 plenary.

SUMMARY

Compared with existing Long-Term Evolution (LTE) V2X systems, NR V2X has one significant feature that it supports unicast and groupcast and supports Hybrid Automatic Repeat reQuest (HARQ) functions. A Physical Sidelink Feedback Channel (PSFCH) channel is introduced to apply to HARQ-Acknowledgement (HARQ-ACK) transmission on a sidelink. According to the results of the 3GPP RANI #96b session, PSFCH resources may be periodically configured or preconfigured.

At the 3GPP RAN #83 plenary, two sidelink resource allocation modes are defined, including: a resource allocation Mode 1 controlled by cellular network interface (Uu interface) and a resource allocation Mode 2 based on sensing and resource selection. Under the Mode 1, a base station controls the resource allocation on a sidelink, and a transmitting user of a Physical Sidelink Shared Channel (PSSCH) needs to report the HARQ information of sidelink communication to the base station on an uplink. How does a base station allocate uplink resources for sidelink HARQ feedbacks is a problem to be solved.

In view of the above problems, the disclosure provides a solution. It should be noted that the embodiments of the first node of the disclosure and the characteristics in the embodiments may be applied to the second node if no conflict is incurred, and vice versa. The embodiments of the disclosure and the characteristics in the embodiments may be mutually combined arbitrarily if no conflict is incurred.

The disclosure provides a method in a first node for wireless communication, wherein the method includes:
receiving a first signaling;
transmitting a first bit block set in a first air interface resource block;
receiving a second signal in a second air interface resource block; and
transmitting a third signal in a third air interface resource block.

Herein, the first signaling is used for determining the first air interface resource block, and the first air interface resource block is used for determining the second air interface resource block; the second signal indicates whether the first bit block set is correctly received; the second signal is used for determining the third signal, and the third signal indicates whether the first bit block set is correctly received; the first signaling indicates a first time interval, a time interval between a time unit to which the third air interface resource block belongs and a time unit to which the second air interface resource block belongs is the first time interval; and a transmitter of the first signaling is different from a transmitter of the second signal.

In one embodiment, the problem to be solved by the disclosure includes: under the Mode 1, how does a base station allocate uplink resources for sidelink HARQ information feedback. The above method solves this problem through indicating, in a downlink signaling that allocates sidelink resources, a relative relationship between related uplink resources and PSFCH resources.

In one embodiment, the above method is characterized in that: the first bit block set is transmitted on a PSSCH, the second signal and the third signal both carry a HARQ-ACK of the first bit block set, the second signal is transmitted on a PSFCH, and the third signal is transmitted on a Physical Uplink Control Channel (PUCCH). The first signaling indicates PUCCH resources through indicating a relative relationship between PUCCH resources and PSFCH resources.

In one embodiment, the above method has the following benefits: it is avoided that a change in a relative relationship between the PSSCH and the corresponding PSFCH impacts the downlink signaling that allocates PSSCH resources, the design of the downlink signaling for sidelink resource allocation is simplified, and overheads of the signaling for indicating corresponding PUCCH resources are reduced.

According to one aspect of the disclosure, the first signaling includes a first field, and the first field in the first signaling indicates the first time interval.

According to one aspect of the disclosure, the method includes:
transmitting a second signaling in a first air interface resource subblock.

Herein, the first air interface resource subblock is a subset of the first air interface resource block, and the second signaling includes scheduling information of the first bit block set.

According to one aspect of the disclosure, the first signaling is used for determining K first-type air interface resource blocks and K third-type air interface resource blocks, the K is a positive integer greater than 1, the K third-type air interface resource blocks are reserved for HARQ-ACKs corresponding to bit block sets transmitted in the K first-type air interface resource blocks respectively, and the first air interface resource block is one of the K first-type air interface resource blocks.

According to one aspect of the disclosure, the K first-type air interface resource blocks are used for determining K second-type air interface resource blocks respectively, the second air interface resource block is one of the K second-type air interface resource blocks that is corresponding to the first air interface resource block; a reference first-type air interface resource block is any one of the K first-type air interface resource blocks; when the first node transmits one reference bit block set in the reference first-type air interface resource block, the first node receives a HARQ-ACK corresponding to the reference bit block set in a second-type air interface resource block corresponding to the reference first-type air interface resource block; and a time interval between a time unit to which a third-type air interface resource block corresponding to the reference first-type air interface resource block belongs and a time unit to which a second-type air interface resource block corresponding to the reference first-type air interface resource block belongs is the first time interval.

According to one aspect of the disclosure, the method includes:

receiving second information.

Herein, the second information is used for determining a first air interface resource pool, and the first air interface resource block belongs to the first air interface resource pool;

According to one aspect of the disclosure, the method includes:

receiving second information.

Herein, the second information is used for determining a second air interface resource pool, and the second air interface resource block belongs to the second air interface resource pool.

According to one aspect of the disclosure, the method includes:

receiving second information.

Herein, the second information is used for determining a first air interface resource pool and a second air interface resource pool, the first air interface resource block and the second air interface resource block belong to the first air interface resource pool and the second air interface resource pool respectively.

According to one aspect of the disclosure, the method includes:

transmitting third information.

Herein, the third information is used for determining a first air interface resource pool, and the first air interface resource block belongs to the first air interface resource pool.

According to one aspect of the disclosure, the method includes:

transmitting third information.

Herein, the third information is used for determining a second air interface resource pool, and the second air interface resource block belongs to the second air interface resource pool.

According to one aspect of the disclosure, the method includes:

transmitting third information.

Herein, the third information is used for determining a first air interface resource pool and a second air interface resource pool, the first air interface resource block and the second air interface resource block belong to the first air interface resource pool and the second air interface resource pool respectively.

According to one aspect of the disclosure, the first node is a User Equipment (UE).

According to one aspect of the disclosure, the first node is a relay node.

The disclosure provides a method in a second node for wireless communication, wherein the method includes:

transmitting a first signaling; and receiving a third signal in a third air interface resource block.

Herein, the first signaling is used for determining a first air interface resource block, and the first air interface resource block is used for determining a second air interface resource block; a transmitter of the third signal transmits a first bit block set in the first air interface resource block and receives a second signal in the second air interface resource block; the second signal indicates whether the first bit block set is correctly received; the second signal is used for determining the third signal, and the third signal indicates whether the first bit block set is correctly received; the first signaling indicates a first time interval, a time interval between a time unit to which the third air interface resource block belongs and a time unit to which the second air interface resource block belongs is the first time interval; and the second node is different from a transmitter of the second signal.

According to one aspect of the disclosure, the first signaling includes a first field, and the first field in the first signaling indicates the first time interval.

According to one aspect of the disclosure, the first signaling is used for determining K first-type air interface resource blocks and K third-type air interface resource blocks, and the K is a positive integer greater than 1; the K third-type air interface resource blocks are reserved for HARQ-ACKs corresponding to bit block sets transmitted in the K first-type air interface resource blocks respectively; and the first air interface resource block is one of the K first-type air interface resource blocks.

According to one aspect of the disclosure, the K first-type air interface resource blocks are used for determining K second-type air interface resource blocks respectively, the second air interface resource block is one of the K second-type air interface resource blocks that is corresponding to the first air interface resource block; a reference first-type air interface resource block is any one of the K first-type air interface resource blocks; when the transmitter of the third signal transmits one reference bit block set in the reference first-type air interface resource block, the transmitter of the third signal receives a HARQ-ACK corresponding to the reference bit block set in a second-type air interface resource block corresponding to the reference first-type air interface resource block; and a time interval between a time unit to which a third-type air interface resource block corresponding to the reference first-type air interface resource block belongs and a time unit to which a second-type air interface resource block corresponding to the reference first-type air interface resource block belongs is the first time interval.

According to one aspect of the disclosure, the method includes:

transmitting second information.

Herein, the second information is used for determining a first air interface resource pool, and the first air interface resource block belongs to the first air interface resource pool.

According to one aspect of the disclosure, the method includes:

transmitting second information.

Herein, the second information is used for determining a second air interface resource pool, and the second air interface resource block belongs to the second air interface resource pool.

According to one aspect of the disclosure, the method includes:

transmitting second information.

Herein, the second information is used for determining a first air interface resource pool and a second air interface resource pool, the first air interface resource block and the second air interface resource block belong to the first air interface resource pool and the second air interface resource pool respectively.

According to one aspect of the disclosure, the second node is a base station.

According to one aspect of the disclosure, the second node is a relay node.

The disclosure provides a method in a third node for wireless communication, wherein the method includes:

receiving a first bit block set in a first air interface resource block; and transmitting a second sub-signal in a second air interface resource block.

Herein, the first air interface resource block is used for determining the second air interface resource block; and the second sub-signal indicates whether the first bit block set is correctly received.

According to one aspect of the disclosure, the method includes:

receiving a second signaling in a first air interface resource subblock.

Herein, the first air interface resource subblock is a subset of the first air interface resource block; and the second signaling includes scheduling information of the first bit block set.

According to one aspect of the disclosure, the method includes:

receiving third information.

Herein, the third information is used for determining a first air interface resource pool, and the first air interface resource block belongs to the first air interface resource pool.

According to one aspect of the disclosure, the method includes:

receiving third information.

Herein, the third information is used for determining a second air interface resource pool, and the second air interface resource block belongs to the second air interface resource pool.

According to one aspect of the disclosure, the method includes:

receiving third information.

Herein, the third information is used for determining a first air interface resource pool and a second air interface resource pool, the first air interface resource block and the second air interface resource block belong to the first air interface resource pool and the second air interface resource pool respectively.

According to one aspect of the disclosure, the third node is a UE.

According to one aspect of the disclosure, the third node is a relay node.

The disclosure provides a first node for wireless communication, wherein the first node includes:

a first receiver, to receive a first signaling;

a first transmitter, to transmit a first bit block set in a first air interface resource block;

a second receiver, to receive a second signal in a second air interface resource block;

and a second transmitter, to transmit a third signal in a third air interface resource block.

Herein, the first signaling is used for determining the first air interface resource block, and the first air interface resource block is used for determining the second air interface resource block; the second signal indicates whether the first bit block set is correctly received; the second signal is used for determining the third signal, and the third signal indicates whether the first bit block set is correctly received; the first signaling indicates a first time interval, a time interval between a time unit to which the third air interface resource block belongs and a time unit to which the second air interface resource block belongs is the first time interval; and a transmitter of the first signaling is different from a transmitter of the second signal.

The disclosure provides a second node for wireless communication, wherein the second node includes:

a third transmitter, to transmit a first signaling; and a third receiver, to receive a third signal in a third air interface resource block.

Herein, the first signaling is used for determining a first air interface resource block, and the first air interface resource block is used for determining a second air interface resource block; a transmitter of the third signal transmits a first bit block set in the first air interface resource block and receives a second signal in the second air interface resource block; the second signal indicates whether the first bit block set is correctly received; the second signal is used for determining the third signal, and the third signal indicates whether the first bit block set is correctly received; the first signaling indicates a first time interval, a time interval between a time unit to which the third air interface resource block belongs and a time unit to which the second air interface resource block belongs is the first time interval; and the second node is different from a transmitter of the second signal.

The disclosure provides a third node for wireless communication, wherein the second node includes:

a further receiver, to receive a first bit block set in a first air interface resource block;

a fourth transmitter, to transmit a second sub-signal in a second air interface resource block.

Herein, the first air interface resource block is used for determining the second air interface resource block; and the second sub-signal indicates whether the first bit block set is correctly received.

In one embodiment, compared with conventional schemes, the disclosure has the following advantages.

Under the sidelink communication Mode 1, the base station indicates, in a downlink signal allocating sidelink PSSCH resources, a relative relationship between uplink resources used for feeding back relative HARQ information and PSFCH resources, thereby solving the problem of allocation of uplink resources used for feeding back sidelink HARQ information.

Through indicating the relative relationship between uplink resources used for feeding back HARQ and relative PSFCH resources, it is avoided that a change in a relative relationship between the PSSCH and the corresponding PSFCH impacts the downlink signaling that allocates PSSCH resources, the design of the downlink signaling for sidelink resource allocation is simplified, and signaling overheads required to allocate the uplink resources feeding back sidelink HARQ information are reduced.

BRIEF DESCRIPTION OF THE DRAWINGS

Other features, purposes and advantages of the disclosure will become more apparent from the detailed description of non-restrictive embodiments taken in conjunction with the following drawings.

DESCRIPTION OF THE EMBODIMENTS

The technical scheme of the disclosure is described below in further detail in conjunction with the drawings. It should be noted that the embodiments in the disclosure and the characteristics of the embodiments may be mutually combined arbitrarily if no conflict is incurred.

Embodiment 1

Figure 1:
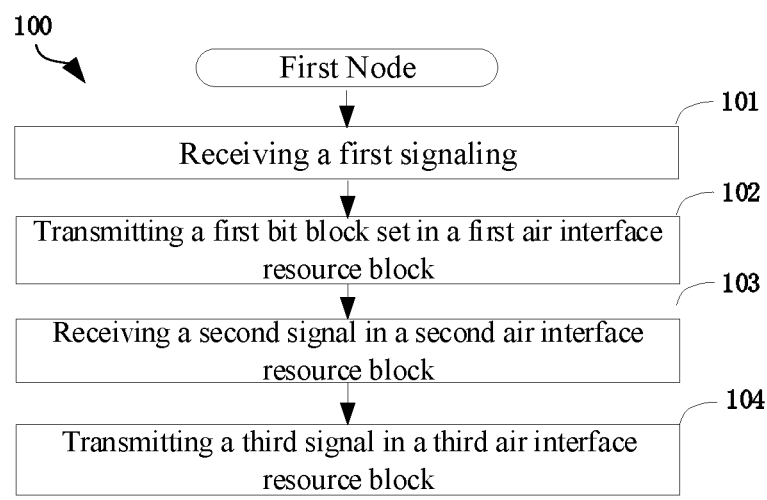
FIG. 1 is a flowchart of a first signaling, a first bit block set, a second signal and a third signal according to one embodiment of the disclosure.

Embodiment 1 illustrates a flowchart of a first signaling, a first bit block set, a second signal and a third signal according to one embodiment of the disclosure, as shown in FIG. 1. In 100 shown in FIG. 1, each box represents one step. Particularly, the order of steps in the box does not represent a specific time sequence between each step.

In Embodiment 1, the first node in the disclosure receives a first signaling in S101, transmits a first bit block set in a first air interface resource block in S102, receives a second signal in a second air interface resource block in S103, transmits a third signal in a third air interface resource block in S104. Herein, the first signaling is used for determining the first air interface resource block, and the first air interface resource block is used for determining the second air interface resource block; the second signal indicates whether the first bit block set is correctly received; the second signal is used for determining the third signal, and the third signal indicates whether the first bit block set is correctly received; the first signaling indicates a first time interval, a time interval between a time unit to which the third air interface resource block belongs and a time unit to which the second air interface resource block belongs is the first time interval; and a transmitter of the first signaling is different from a transmitter of the second signal.

In one embodiment, the first signaling indicates the first air interface resource block.

In one embodiment, the first signaling indicates explicitly the first air interface resource block.

In one embodiment, the first signaling indicates implicitly the first air interface resource block.

In one embodiment, the first signaling indicates frequency domain resources occupied by the first air interface resource block.

In one embodiment, the first signaling indicates time domain resources occupied by the first air interface resource block.

In one embodiment, the first bit block set includes a positive integer number of bit block(s).

In one embodiment, the first bit block set includes one bit block only.

In one embodiment, the first bit block set includes multiple bit blocks.

In one embodiment, each bit block included in the first bit block set includes a positive integer number of binary bits.

In one embodiment, any one bit block included in the first bit block set is one Transport Block (TB).

In one embodiment, any one bit block included in the first bit block set is one Code Block Group (CBG).

In one embodiment, any one bit block included in the first bit block set is one TB or one CBG In one embodiment, the first bit block set is unicast transmitted.

In one embodiment, the first bit block set is groupcast transmitted.

In one embodiment, the first bit block set is transmitted on a sidelink.

In one embodiment, the first bit block set is transmitted through a PC5 interface.

In one embodiment, the second signal is one radio signal.

In one embodiment, the second signal is one baseband signal.

In one embodiment, the second signal carries a HARQ-ACK.

In one embodiment, the second signal carries Channel State Information (CSI).

In one embodiment, the second signal indicates whether each bit block in the first bit block set is correctly received.

In one embodiment, the second signal is unicast transmitted.

In one embodiment, the second signal is groupcast transmitted.

In one embodiment, the second signal is transmitted on a sidelink.

In one embodiment, the second signal is transmitted through a PC5 interface.

In one embodiment, the third signal is one radio signal.

In one embodiment, the third signal is one baseband signal.

In one embodiment, the third signal includes a HARQ-ACK.

In one embodiment, the third signal includes a CSI.

In one embodiment, the third signal indicates whether each bit block in the first bit block set is correctly received.

In one embodiment, the third signal is transmitted through a Uu interface.

In one embodiment, the third signal is transmitted through an uplink.

In one embodiment, the second signal is transmitted on a sidelink and the third signal is transmitted on an uplink.

In one embodiment, the phrase that a transmitter of the first signaling is different from a transmitter of the second signal includes: the transmitter of the second signal includes a first reference node, the transmitter of the first signaling is a second reference node, and the first reference node is not Quasi Co-Located (QCLed) with the second reference node.

In one embodiment, the phrase that two nodes are not QCLed refers that: large-scale properties of a channel experienced by a radio signal transmitted from one of the two nodes cannot be deduced from large-scale properties of a channel experienced by a radio signal transmitted from the other node of the two nodes. The large-scale properties include one or more of delay spread, Doppler spread, Doppler shift, average gain, average delay or spatial Rx parameters.

In one embodiment, the specific definition of the QCL can refer to Section 4.4 in 3GPP TS38.211.

In one embodiment, the phrase that a transmitter of the first signaling is different from a transmitter of the second signal includes: the transmitter of the second signal includes one UE, and the transmitter of the first signaling is one base station.

In one embodiment, the phrase that a transmitter of the first signaling is different from a transmitter of the second signal includes: the transmitter of the second signal includes one relay equipment, and the transmitter of the first signaling is one base station.

In one embodiment, the phrase that the second signal is used for determining the third signal includes: both the second signal and the third signal carry a first information block, and the first information block indicates whether the first bit block set is correctly received.

In one subembodiment, the first information block indicates whether each bit block in the first bit block set is correctly received.

In one embodiment, the phrase that the second signal is used for determining the third signal includes: the second signal includes M sub-signals, the M sub-signals carry M fourth information blocks respectively, and the M is a positive integer greater than 1; the third signal carries a fifth information block; any one of the M fourth information blocks indicates whether the first bit block set is correctly received, and the fifth information block indicates whether the first bit block set is correctly received; and the M fourth information blocks are used for determining the fifth information block.

In one subembodiment, M1 fourth information blocks among the M fourth information blocks indicate that the first bit block set is not correctly received; when the M1 is greater than a first threshold, the fifth information block indicates that the first bit block set is not correctly received.

In one subembodiment, M2 fourth information blocks among the M fourth information blocks indicate that the first bit block set is correctly received; when the M2 is greater than a second threshold, the fifth information block indicates that the first bit block set is correctly received.

In one embodiment, the phrase that the second signal is used for determining the third signal includes: both the second signal and the third signal carry a first identifier, and the first identifier indicates the first bit block set.

In one subembodiment, the first signaling indicates the first identifier.

In one subembodiment, the second signaling in the disclosure indicates the first identifier.

In one subembodiment, the first identifier includes a HARQ process number.

In one subembodiment, the first identifier includes a HARQ process number corresponding to each bit block in the first bit block set.

In one embodiment, the first signaling indicates explicitly the first time interval.

In one embodiment, the first time interval is in unit of slot.

In one embodiment, the first time interval is in unit of sub-slot.

In one embodiment, the first time interval is in unit of mini-slot.

In one embodiment, the first time interval is in unit of sub-frame.

In one embodiment, the first time interval is in unit of a positive integer number of multicarrier symbols.

In one embodiment, the first time interval is a positive integer.

In one embodiment, the first time interval is a non-negative integer.

In one embodiment, a unit of the first time interval is related to the first air interface resource block.

In one embodiment, the first air interface resource pool is one of P candidate resource pools, and the P is a positive integer greater than 1; the P candidate resource pools correspond to P time units respectively, any one of the P time units includes a positive integer number of consecutive multicarrier symbols, and two of the P time units include different numbers of multicarrier symbols; the unit of the first time interval is a time unit among the P time units that is corresponding to the first air interface resource pool.

In one embodiment, the time unit is one slot.

In one embodiment, the time unit is one sub-slot.

In one embodiment, the time unit is one mini-slot.

In one embodiment, the time unit is one sub-frame.

In one embodiment, the time unit is a positive integer number of multicarrier symbols.

In one embodiment, the phrase that a time interval between a time unit to which the third air interface resource block belongs and a time unit to which the second air interface resource block belongs is the first time interval refers that: the time unit to which the third air interface resource block belongs is an nth time unit, the time unit to which the second air interface resource block belongs is a (n+the first time interval)th time unit.

In one embodiment, the phrase that a time interval between a time unit to which the third air interface resource block belongs and a time unit to which the second air interface resource block belongs is the first time interval refers that: a time interval between an end of a time unit to which the third air interface resource block belongs and an end of a time unit to which the second air interface resource block belongs is the first time interval.

In one embodiment, time domain resources occupied by the third air interface resource block are located within a time unit to which the third air interface resource block belongs; and time domain resources occupied by the second air interface resource block are located within a time unit to which the second air interface resource block belongs.

Embodiment 2

Figure 2:
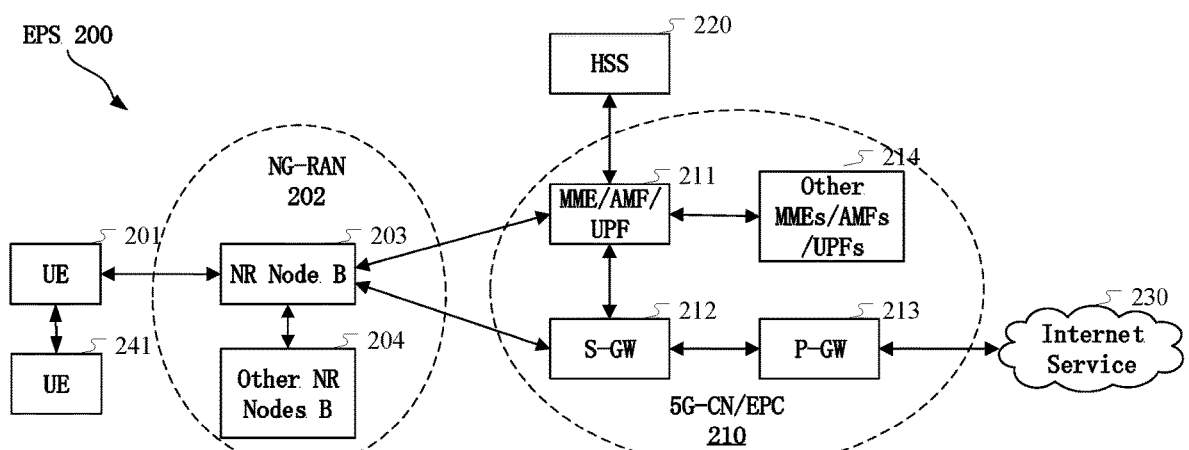
FIG. 2 is a diagram illustrating a network architecture according to one embodiment of the disclosure.

Embodiment 2 illustrates a diagram of a network architecture according to one embodiment of the disclosure, as shown in FIG. 2.

FIG. 2 is a diagram illustrating a network architecture 200 of Long-Term Evolution (LTE), Long-Term Evolution Advanced (LTE-A) and future 5G systems. The network architecture 200 of the LTE, LTE-A and future 5G systems may be called an Evolved Packet System (EPS) 200. The EPS 200 may include one or more UEs 201, one UE 241 in sidelink communication with the UE 201, a Next Generation-Radio Access Network (NG-RAN) 202, an 5G-Core Network/Evolved Packet Core (5G-CN/EPC) 210, a Home Subscriber Server (HSS) 220 and an Internet service 230. The EPS may be interconnected with other access networks. For simple description, the entities/interfaces are not shown. As shown in FIG. 2, the EPS provides packet switching services. Those skilled in the art are easy to understand that various concepts presented throughout the disclosure can be extended to networks providing circuit switching services or other cellular networks. The NG-RAN includes an NR node B (gNB) 203 and other gNBs 204. The gNB 203 provides UE 201 oriented user plane and control plane protocol terminations. The gNB 203 may be connected to other gNBs 204 via an X2 interface (for example, backhaul). The gNB 203 may be called a base station, a base transceiver station, a radio base station, a radio transceiver, a transceiver function, a Basic Service Set (BSS), an Extended Service Set (ESS), a TRP or some other appropriate terms. The gNB 203 provides an access point of the 5G-CN/EPC 210 for the UE 201. Examples of UE 201 include cellular phones, smart phones, Session Initiation Protocol (SIP) phones, laptop computers, Personal Digital Assistants (PDAs), satellite radios, non-terrestrial base statin communications, satellite mobile communications, Global Positioning Systems (GPSs), multimedia devices, video devices, digital audio player (for example, MP3 players), cameras, games consoles, unmanned aerial vehicles, air vehicles, narrow-band physical network equipment, machine-type communication equipment, land vehicles, automobiles, wearable equipment, or any other devices having similar functions. Those skilled in the art may also call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client or some other appropriate terms. The gNB 203 is connected to the 5G-CN/EPC 210 via an S1/NG interface. The 5G-CN/EPC 210 includes a Mobility Management Entity/Authentication Management Field/User Plane Function (MME/AMF/UPF) 211, other MMEs/AMFs/UPFs 214, a Service Gateway (S-GW) 212 and a Packet Data Network Gateway (P-GW) 213. The MME/AMF/UPF 211 is a control node for processing a signaling between the UE 201 and the 5G-CN/EPC 210. Generally, the MME/AMF/UPF 211 provides bearer and connection management. All user Internet Protocol (IP) packets are transmitted through the S-GW 212. The S-GW 212 is connected to the P-GW 213. The P-GW 213 provides UE IP address allocation and other functions. The P-GW 213 is connected to the Internet service 230. The Internet service 230 includes IP services corresponding to operators, specifically including internet, intranet, IP Multimedia Subsystems (IP IMSs) and PS Streaming Services (PSSs).

In one embodiment, the first node in the disclosure includes the UE 201.

In one embodiment, the second node in the disclosure includes the gNB 203.

In one embodiment, the third node in the disclosure includes the UE 241.

In one embodiment, an air interface between the UE 201 and the gNB 203 is a Uu interface.

In one embodiment, a wireless link between the UE 201 and the gNB 203 is a cellular network link.

In one embodiment, an air interface between the UE 201 and the UE 241 is a PC5 interface.

In one embodiment, a wireless link between the UE 201 and the UE 241 is a sidelink.

In one embodiment, the first node in the disclosure is one terminal in the coverage of the gNB 203.

In one embodiment, the third node in the disclosure is one terminal in the coverage of the gNB 203.

In one embodiment, the third node in the disclosure is one terminal out of the coverage of the gNB 203.

In one embodiment, unicast transmission is supported between the UE 201 and the UE 241.

In one embodiment, broadcast transmission is supported between the UE 201 and the UE 241.

In one embodiment, groupcast transmission is supported between the UE 201 and the UE 241.

In one embodiment, a transmitter of the first signaling in the disclosure includes the gNB 203.

In one embodiment, a receiver of the first signaling in the disclosure includes the UE 201.

In one embodiment, a transmitter of the first bit block set in the disclosure includes the UE 201.

In one embodiment, a receiver of the first bit block set in the disclosure includes the UE 241.

In one embodiment, a transmitter of the second signal in the disclosure includes the UE 241.

In one embodiment, a receiver of the second signal in the disclosure includes the UE 201.

In one embodiment, a transmitter of the third signal in the disclosure includes the UE 201.

In one embodiment, a receiver of the third signal in the disclosure includes the gNB 203.

Embodiment 3

Figure 3:
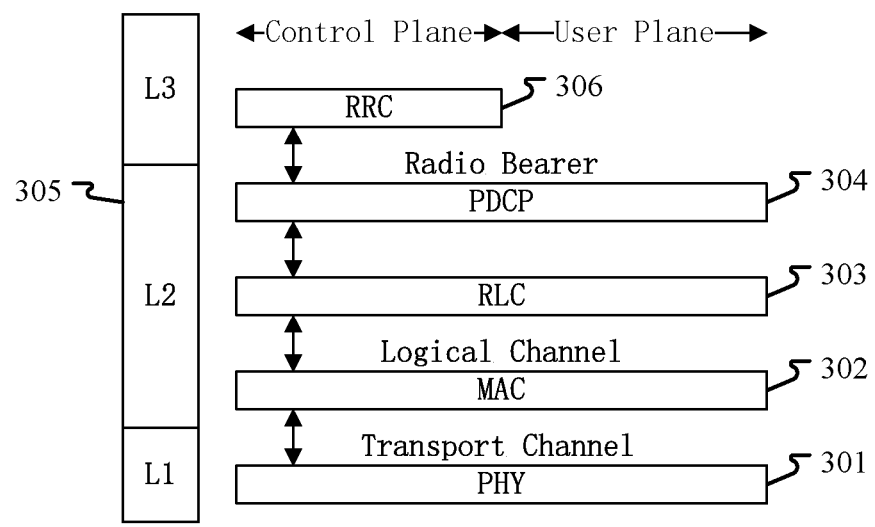
FIG. 3 is a diagram illustrating an embodiment of a radio protocol architecture of a user plane and a control plane according to one embodiment of the disclosure.

Embodiment 3 illustrates a diagram of an embodiment of a radio protocol architecture of a user plane and a control plane according to the disclosure, as shown in FIG. 3.

FIG. 3 is a diagram illustrating an embodiment of a radio protocol architecture of a user plane and a control plane. In FIG. 3, the radio protocol architecture of a UE and a gNB is illustrated by three layers, which are a Layer 1, a Layer 2 and a Layer 3 respectively. The Layer 1 (L1 layer) 301 is the lowest layer and implements various PHY (physical layer) signal processing functions. The L1 layer will be referred to herein as the PHY 301. The Layer 2 (L2 layer) 305 is above the PHY 301, and is responsible for the link between the UE and the gNB over the PHY 301. In the user plane, the L2 layer 305 includes a Medium Access Control (MAC) sublayer 302, a Radio Link Control (RLC) sublayer 303, and a Packet Data Convergence Protocol (PDCP) sublayer 304, which are terminated at the gNB on the network side. Although not shown in FIG. 3, the UE may include several higher layers above the L2 layer 305, including a network layer (i.e. IP layer) terminated at the P-GW 213 on the network side and an application layer terminated at the other end (i.e. a peer UE, a server, etc.) of the connection. The PDCP sublayer 304 provides multiplexing between different radio bearers and logical channels. The PDCP sublayer 304 also provides header compression for higher-layer packets so as to reduce radio transmission overheads. The PDCP sublayer 304 provides security by encrypting packets and provides support for UE handover between gNBs. The RLC sublayer 303 provides segmentation and reassembling of higher-layer packets, retransmission of lost packets, and reordering of lost packets to as to compensate for out-of-order reception due to HARQ. The MAC sublayer 302 provides multiplexing between logical channels and transport channels. The MAC sublayer 302 is also responsible for allocating various radio resources (i.e., resource blocks) in one cell among UEs. The MAC sublayer 302 is also in charge of HARQ operations. In the control plane, the radio protocol architecture of the UE and the gNB is almost the same as the radio protocol architecture in the user plane on the PHY 301 and the L2 layer 305, with the exception that there is no header compression function for the control plane. The control plane also includes a Radio Resource Control (RRC) sublayer 306 in the layer 3 (L3). The RRC sublayer 306 is responsible for acquiring radio resources (i.e. radio bearers) and configuring lower layers using an RRC signaling between the gNB and the UE.

In one embodiment, the radio protocol architecture shown in FIG. 3 is applicable to the first node in the disclosure.

In one embodiment, the radio protocol architecture shown in FIG. 3 is applicable to the second node in the disclosure.

In one embodiment, the radio protocol architecture shown in FIG. 3 is applicable to the third node in the disclosure.

In one embodiment, the first signaling in the disclosure is generated on the PHY 301.

In one embodiment, the first signaling in the disclosure is generated on the MAC sublayer 302.

In one embodiment, the first signaling in the disclosure is generated on the RRC sublayer 306.

In one embodiment, the first bit block set in the disclosure is generated on the PHY 301.

In one embodiment, the first bit block set in the disclosure is generated on the MAC sublayer 302.

In one embodiment, the first bit block set in the disclosure is generated on the RRC sublayer 306.

In one embodiment, the second signal in the disclosure is generated on the PHY 301.

In one embodiment, the second signal in the disclosure is generated on the MAC sublayer 302.

In one embodiment, the third signal in the disclosure is generated on the PHY 301.

In one embodiment, the third signal in the disclosure is generated on the MAC sublayer 302.

In one embodiment, the second signaling in the disclosure is generated on the PHY 301.

In one embodiment, the second signaling in the disclosure is generated on the MAC sublayer 302.

In one embodiment, the second information in the disclosure is generated on the MAC sublayer 302.

In one embodiment, the second information in the disclosure is generated on the RRC sublayer 306.

In one embodiment, the third information in the disclosure is generated on the MAC sublayer 302.

In one embodiment, the third information in the disclosure is generated on the RRC sublayer 306.

Embodiment 4

Figure 4:
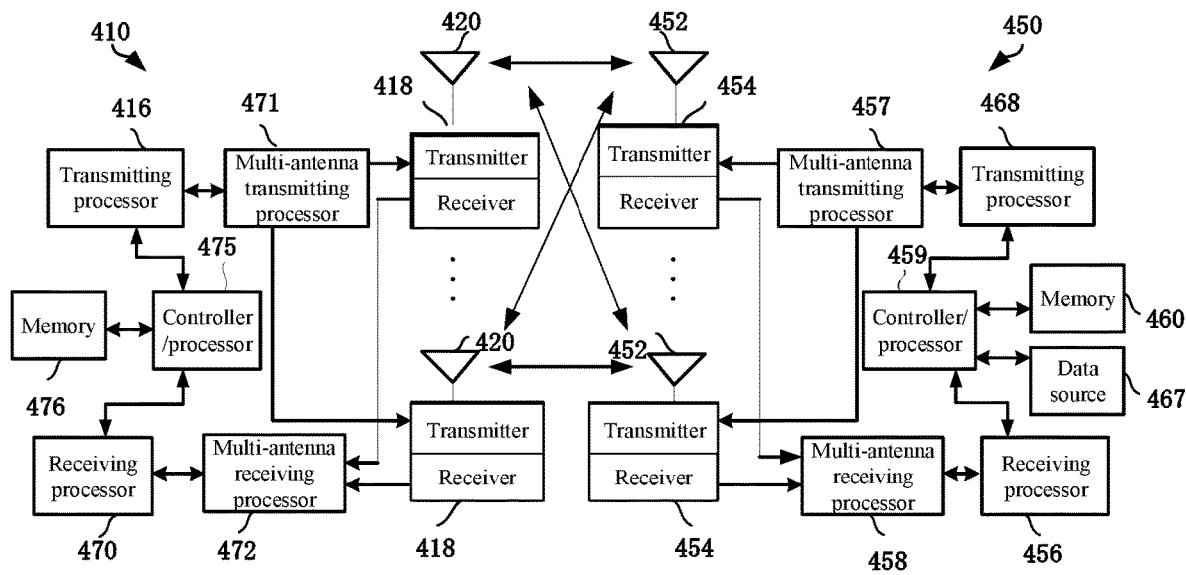
FIG. 4 is a diagram illustrating a first communication equipment and a second communication equipment according to one embodiment of the disclosure.

Embodiment 4 illustrates a diagram of a first communication equipment and a second communication equipment according to the disclosure, as shown in FIG. 4. FIG. 4 is a block diagram of a second communication equipment 450 and a first communication equipment 410 that are in communication with each other in an access network.

The first communication equipment 410 includes a controller/processor 475, a memory 476, a receiving processor 470, a transmitting processor 416, a multi-antenna receiving processor 472, a multi-antenna transmitting processor 471, a transmitter/receiver 418 and an antenna 420.

The second communication equipment 450 includes a controller/processor 459, a memory 460, a data source 467, a transmitting processor 468, a receiving processor 456, a multi-antenna transmitting processor 457, a multi-antenna receiving processor 458, a transmitter/receiver 454 and an antenna 452.

In a transmission from the first communication equipment 410 to the second communication equipment 450, at the first communication equipment 410, a higher-layer packet from a core network is provided to the controller/processor 475. The controller/processor 475 provides functions of Layer 2. In DL, the controller/processor 475 provides header compression, encryption, packet segmentation and reordering, multiplexing between a logical channel and a transport channel, and a radio resource allocation for the second communication equipment 450 based on various priority metrics. The controller/processor 475 is also in charge of retransmission of lost packets, and signalings to the second communication equipment 450. The transmitting processor 416 and the multi-antenna transmitting processor 471 perform various signal processing functions used for Layer 1 (that is, PHY). The transmitting processor 416 performs encoding and interleaving so as to ensure FEC (Forward Error Correction) at the second communication equipment 450 and mappings to signal clusters corresponding to different modulation schemes (i.e., BPSK, QPSK, M-PSK M-QAM, etc.). The multi-antenna transmitting processor 471 processes the encoded and modulated symbols with digital spatial precoding (including precoding based on codebook and precoding based on non-codebook) and beamforming to generate one or more spatial streams. The transmitting processor 416 subsequently maps each spatial stream into a subcarrier to be multiplexed with a reference signal (i.e., pilot) in time domain and/or frequency domain, and then processes it with Inverse Fast Fourier Transform (IFFT) to generate a physical channel carrying time-domain multicarrier symbol streams. Then, the multi-antenna transmitting processor 471 processes the time-domain multicarrier symbol streams with transmitting analog precoding/ beamforming. Each transmitter 418 converts a baseband multicarrier symbol stream provided by the multi-antenna transmitting processor 471 into a radio frequency stream and then provides it to different antennas 420.

In a transmission from the first communication equipment 410 to the second communication equipment 450, at the second communication equipment 450, each receiver 454 receives a signal via the corresponding antenna 452. Each receiver 454 recovers the information modulated to the RF carrier and converts the radio frequency stream into a baseband multicarrier symbol stream to provide to the receiving processor 456. The receiving processor 456 and the multi-antenna receiving processor 458 perform various signal processing functions of Layer 1. The multi-antenna receiving processor 458 processes the baseband multicarrier symbol stream coming from the receiver 454 with receiving analog precoding/beamforming. The receiving processor 458 converts the baseband multicarrier symbol stream subjected to the receiving analog precoding/beamforming operation from time domain into frequency domain using FFT (Fast Fourier Transform). In frequency domain, a physical layer data signal and a reference signal are demultiplexed by the receiving processor 456, wherein the reference signal is used for channel estimation, and the data signal is subjected to multi-antenna detection in the multi-antenna receiving processor 458 to recover any spatial stream targeting the UE 450. Symbols on each spatial stream are demodulated and recovered in the receiving processor 456 to generate a soft decision. Then, the receiving processor 456 decodes and de-interleaves the soft decision to recover the higher-layer data and control signal on the physical channel transmitted by the first communication equipment 410. Next, the higher-layer data and control signal are provided to the controller/processor 459. The controller/processor 459 performs functions of Layer 2. The controller/processor 459 may be connected to the memory 460 that stores program codes and data. The memory 460 may be called a computer readable media. In DL, the controller/processor 459 provides multiplexing between the transport channel and the logical channel, packet reassembling, decryption, header decompression, and control signal processing so as to recover the higher-layer packet coming from the core network. The higher-layer packet is then provided to all protocol layers above Layer 2, or various control signals can be provided to Layer 3 for processing. The controller/processor 459 can also perform error detection using ACK and/or NACK protocols to support the HARQ operation.

In a transmission from the second communication equipment 450 to the first communication equipment 410, at the second communication equipment 450, the data source 467 provides a higher-layer packet to the controller/processor 459. The data source 467 illustrates all protocol layers above the L2 layer. Similar as the transmitting function of the first communication equipment 410 described in DL, the controller/processor 459 provides header compression, encryption, packet segmentation and reordering, and multiplexing between a logical channel and a transport channel based on radio resource allocation so as to provide the functions of L2 layer used for the control plane and user plane. The controller/processor 459 is also in charge of retransmission of lost packets, and signalings to the first communication equipment 410. The transmitting processor 468 conducts modulation mapping and channel encoding processing; the multi-antenna transmitting processor 457 performs digital multi-antenna spatial precoding (including precoding based on codebook and precoding based on non-codebook) and beaming processing; and subsequently, the transmitting processor 468 modulates the generated spatial streams into a multicarrier/single-carrier symbol stream, which is subjected to an analog precoding/beamforming operation in the multi-antenna transmitting processor 457 and then is provided to different antennas 452 via the transmitter 454. Each transmitter 452 first converts the baseband symbol stream provided by the multi-antenna transmitting processor 457 into a radio frequency symbol stream and then provides the radio frequency symbol stream to the antenna 452.

In a transmission from the second communication equipment 450 to the first communication equipment 410, the function of the first communication equipment 410 is similar as the receiving function of the second communication equipment 450 described in the transmission from first communication equipment 410 to the second communication equipment 450. Each receiver 418 receives a radio frequency signal via the corresponding antenna 420, converts the received radio frequency signal into a baseband signal, and provides the baseband signal to the multi-antenna receiving processor 472 and the receiving processor 470. The receiving processor 470 and the multi-antenna receiving processor 472 together provide functions of Layer 1. The controller/processor 475 provides functions of Layer 2. The controller/processor 475 may be connected to the memory 476 that stores program codes and data. The memory 476 may be called a computer readable media. The controller/processor 475 provides de-multiplexing between the transport channel and the logical channel, packet reassembling, decryption, header decompression, and control signal processing so as to recover higher-layer packets coming from the second communication equipment 450. The higher-layer packet, coming from the controller/processor 475, may be provided to the core network. The controller/processor 475 can also perform error detection using ACK and/or NACK protocols to support the HARQ operation.

In one embodiment, the second communication equipment 450 includes at least one processor and at least one memory. The at least one memory includes computer program codes. The at least one memory and the computer program codes are configured to be used in collaboration with the at least one processor. The second communication equipment 450 at least receives the first signaling in the disclosure, transmits the first bit block set in the disclosure in the first air interface resource block in the disclosure, receives the second signal in the disclosure in the second air interface resource block in the disclosure, and transmits the third signal in the disclosure in the third air interface resource block in the disclosure. The first signaling is used for determining the first air interface resource block, and the first air interface resource block is used for determining the second air interface resource block; the second signal indicates whether the first bit block set is correctly received; the second signal is used for determining the third signal, and the third signal indicates whether the first bit block set is correctly received; the first signaling indicates a first time interval, a time interval between a time unit to which the third air interface resource block belongs and a time unit to which the second air interface resource block belongs is the first time interval; and a transmitter of the first signaling is different from a transmitter of the second signal.

In one embodiment, the second communication equipment 450 includes a memory that stores a computer readable instruction program. The computer readable instruction program generates an action when executed by at least one processor. The action includes: receiving the first signaling in the disclosure, transmitting the first bit block set in the disclosure in the first air interface resource block in the disclosure, receiving the second signal in the disclosure in the second air interface resource block in the disclosure, and transmitting the third signal in the disclosure in the third air interface resource block in the disclosure. The first signaling is used for determining the first air interface resource block, and the first air interface resource block is used for determining the second air interface resource block; the second signal indicates whether the first bit block set is correctly received; the second signal is used for determining the third signal, and the third signal indicates whether the first bit block set is correctly received; the first signaling indicates a first time interval, a time interval between a time unit to which the third air interface resource block belongs and a time unit to which the second air interface resource block belongs is the first time interval; and a transmitter of the first signaling is different from a transmitter of the second signal.

In one embodiment, the first communication equipment 410 includes at least one processor and at least one memory. The at least one memory includes computer program codes. The at least one memory and the computer program codes are configured to be used in collaboration with the at least one processor. The first communication equipment 410 at least transmits the first signaling in the disclosure, and receives the third signal in the disclosure in the third air interface resource block in the disclosure. The first signaling is used for determining a first air interface resource block, and the first air interface resource block is used for determining a second air interface resource block; a transmitter of the third signal transmits a first bit block set in the first air interface resource block and receives a second signal in the second air interface resource block; the second signal indicates whether the first bit block set is correctly received; the second signal is used for determining the third signal, and the third signal indicates whether the first bit block set is correctly received; the first signaling indicates a first time interval, a time interval between a time unit to which the third air interface resource block belongs and a time unit to which the second air interface resource block belongs is the first time interval; and the first communication equipment 410 is different from a transmitter of the second signal.

In one embodiment, the first communication equipment 410 includes a memory that stores a computer readable instruction program. The computer readable instruction program generates an action when executed by at least one processor. The action includes: transmitting the first signaling in the disclosure, and receiving the third signal in the disclosure in the third air interface resource block in the disclosure. The first signaling is used for determining a first air interface resource block, and the first air interface resource block is used for determining a second air interface resource block; a transmitter of the third signal transmits a first bit block set in the first air interface resource block and receives a second signal in the second air interface resource block; the second signal indicates whether the first bit block set is correctly received; the second signal is used for determining the third signal, and the third signal indicates whether the first bit block set is correctly received; the first signaling indicates a first time interval, a time interval between a time unit to which the third air interface resource block belongs and a time unit to which the second air interface resource block belongs is the first time interval; and the first communication equipment 410 is different from a transmitter of the second signal.

In one embodiment, the first communication equipment 410 includes at least one processor and at least one memory. The at least one memory includes computer program codes. The at least one memory and the computer program codes are configured to be used in collaboration with the at least one processor. The first communication equipment 410 at least receives the first bit block set in the disclosure in the first air interface resource block in the disclosure, and transmits the second sub-signal in the second air interface resource block in the disclosure. The first air interface resource block is used for determining the second air interface resource block. The second sub-signal indicates whether the first bit block set is correctly received.

In one embodiment, the first communication equipment 410 includes a memory that stores a computer readable instruction program. The computer readable instruction program generates an action when executed by at least one processor. The action includes: receiving the first bit block set in the disclosure in the first air interface resource block in the disclosure, and transmitting the second sub-signal in the second air interface resource block in the disclosure. The first air interface resource block is used for determining the second air interface resource block. The second sub-signal indicates whether the first bit block set is correctly received.

In one embodiment, the first node in the disclosure includes the second communication equipment 450.

In one embodiment, the second node in the disclosure includes the first communication equipment 410.

In one embodiment, the third node in the disclosure includes the first communication equipment 410.

In one embodiment, at least one of the antenna 452, the receiver 454, the receiving processor 456, the multiantenna receiving processor 458, the controller/processor 459, the memory 460 or the data source 467 is used for receiving the first signaling in the disclosure; and at least one of the antenna 420, the transmitter 418, the transmitting processor 416, the multiantenna transmitting processor 471, the controller/processor 475 or the memory 476 is used for transmitting the first signaling in the disclosure.

In one embodiment, at least one of the antenna 420, the receiver 418, the receiving processor 470, the multiantenna receiving processor 472, the controller/processor 475 or the memory 476 is used for receiving the first bit block set in the disclosure in the first air interface resource block in the disclosure; and at least one of the antenna 452, the transmitter 454, the transmitting processor 468, the multiantenna transmitting processor 457, the controller/processor 459, the memory 460 or the data source 467 is used for transmitting the first bit block set in the disclosure in the first air interface resource block in the disclosure.

In one embodiment, at least one of the antenna 452, the receiver 454, the receiving processor 456, the multiantenna receiving processor 458, the controller/processor 459, the memory 460 or the data source 467 is used for receiving the second signal in the disclosure in the second air interface resource block in the disclosure; and at least one of the antenna 420, the transmitter 418, the transmitting processor 416, the multiantenna transmitting processor 471, the controller/processor 475 or the memory 476 is used for transmitting the second signal in the disclosure in the second air interface resource block in the disclosure.

In one embodiment, at least one of the antenna 420, the receiver 418, the receiving processor 470, the multiantenna receiving processor 472, the controller/processor 475 or the memory 476 is used for receiving the third signal in the disclosure in the third air interface resource block in the disclosure; and at least one of the antenna 452, the transmitter 454, the transmitting processor 468, the multiantenna transmitting processor 457, the controller/processor 459, the memory 460 or the data source 467 is used for transmitting the third signal in the disclosure in the third air interface resource block in the disclosure.

In one embodiment, at least one of the antenna 420, the receiver 418, the receiving processor 470, the multiantenna receiving processor 472, the controller/processor 475 or the memory 476 is used for receiving the second signaling in the disclosure in the first air interface resource subblock in the disclosure; and at least one of the antenna 452, the transmitter 454, the transmitting processor 468, the multiantenna transmitting processor 457, the controller/processor 459, the memory 460 or the data source 467 is used for transmitting the second signaling in the disclosure in the first air interface resource subblock in the disclosure.

In one embodiment, at least one of the antenna 452, the receiver 454, the receiving processor 456, the multiantenna receiving processor 458, the controller/processor 459, the memory 460 or the data source 467 is used for receiving the second information in the disclosure; and at least one of the antenna 420, the transmitter 418, the transmitting processor 416, the multiantenna transmitting processor 471, the controller/processor 475 or the memory 476 is used for transmitting the second information in the disclosure.

In one embodiment, at least one of the antenna 420, the receiver 418, the receiving processor 470, the multiantenna receiving processor 472, the controller/processor 475 or the memory 476 is used for receiving the third information in the disclosure; and at least one of the antenna 452, the transmitter 454, the transmitting processor 468, the multiantenna transmitting processor 457, the controller/processor 459, the memory 460 or the data source 467 is used for transmitting the third information in the disclosure.

Embodiment 5

Figure 5:
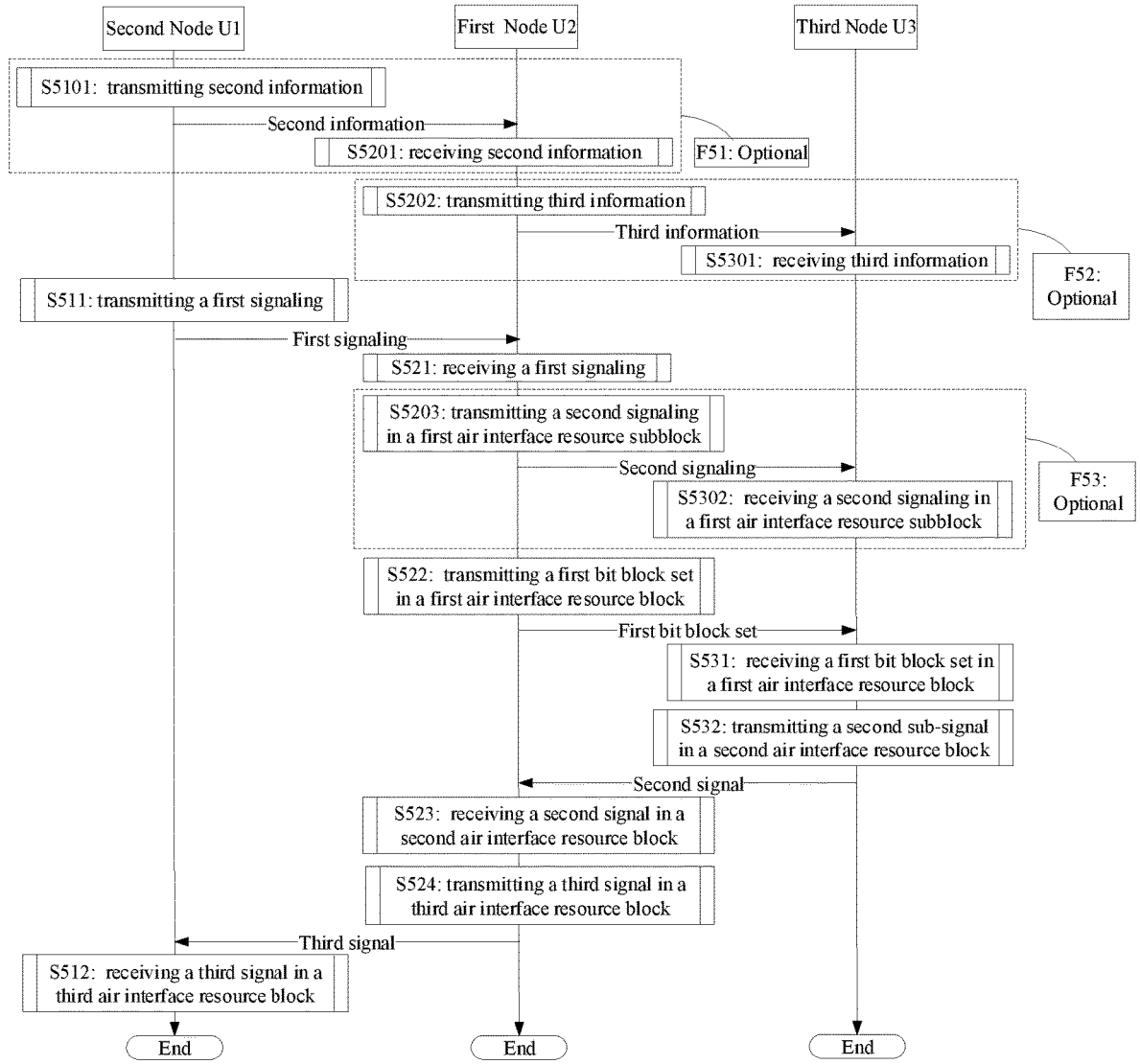
FIG. 5 is a flowchart of transmission according to one embodiment of the disclosure.

Embodiment 5 illustrates a flowchart of wireless transmission according to one embodiment of the disclosure, as shown in FIG. 5. In FIG. 5, a second node U1, a first node U2 and a third node U3 are communication nodes which perform transmission in pairs through air interfaces. In FIG. 5, steps in boxes F51 to F53 are optional.

The second node U1 transmits second information in S5101, transmits a first signaling in S511, and receives a third signal in a third air interface resource block in S512.

The first node U2 receives second information in S5201, transmits third information in S5202, receives a first signaling in S521, transmits a second signaling in a first air interface resource subblock in S5203, transmits a first bit block set in a first air interface resource block in S522, receives a second signal in a second air interface resource block in S523, and transmits a third signal in a third air interface resource block in S524.

The third node U3 receives third information in S5301, receives a second signaling in a first air interface resource subblock in S5302, receives a first bit block set in a first air interface resource block in S531, and transmits a second sub-signal in a second air interface resource block in S532.

In Embodiment 5, the first signaling is used by the first node U2 to determine the first air interface resource block, and the first air interface resource block is used by the first node U2 and the third node U3 to determine the second air interface resource block; the second signal indicates whether the first bit block set is correctly received; the second signal is used by the first node U2 to determine the third signal, and the third signal indicates whether the first bit block set is correctly received; the first signaling indicates a first time interval, a time interval between a time unit to which the third air interface resource block belongs and a time unit to which the second air interface resource block belongs is the first time interval; and a transmitter of the first signaling is different from a transmitter of the second signal. The first air interface resource subblock is a subset of the first air interface resource block, and the second signaling includes scheduling information of the first bit block set. The second signal includes the second sub-signal, and the second sub-signal indicates whether the first bit block set is correctly received.

In one embodiment, the second node in the disclosure includes a maintenance base station for a serving cell of the first node in the disclosure.

In one embodiment, the first node U2 is the first node in the disclosure.

In one embodiment, the second node U1 is the second node in the disclosure.

In one embodiment, the third node U3 is the third node in the disclosure.

In one embodiment, an air interface between the second node U1 and the first node U2 is a Uu interface.

In one embodiment, an air interface between the second node U1 and the first node U2 includes a radio interface between a base station and a UE.

In one embodiment, an air interface between the second node U1 and the first node U2 includes a radio interface between a relay node and a UE.

In one embodiment, an air interface between the third node U3 and the first node U2 is a PC5 interface.

In one embodiment, an air interface between the third node U3 and the first node U2 includes a sidelink.

In one embodiment, an air interface between the third node U3 and the first node U2 includes a radio interface between a relay node and a UE.

In one embodiment, an air interface between the third node U3 and the first node U2 includes a radio interface between a UE and a UE.

In one embodiment, the first node in the disclosure is one terminal.

In one embodiment, the first node in the disclosure is one car.

In one embodiment, the first node in the disclosure is one vehicle.

In one embodiment, the first node in the disclosure is one Road Side Unit (RSU).

In one embodiment, the third node in the disclosure is one terminal.

In one embodiment, the third node in the disclosure is one car.

In one embodiment, the third node in the disclosure is one vehicle.

In one embodiment, the third node in the disclosure is one RSU.

In one embodiment, the second signal includes M sub-signals, and the M is a positive integer greater than 1; any one of the M sub-signals indicates whether the first bit block set is correctly received; and the second sub-signal is one of the M sub-signals.

In one subembodiment, transmitters of any two of the M sub-signals are different.

In one subembodiment, transmitters of any two of the M sub-signals are not QCLed.

In one subembodiment, any one of the M sub-signals indicates whether each bit block in the first bit block set is correctly received.

In one subembodiment, any one of the M sub-signals is transmitted on a PSFCH.

In one embodiment, the second signal is the second sub-signal.

In one embodiment, the second information is used by the first node U2 to determine a first air interface resource pool, and the first air interface resource block belongs to the first air interface resource pool.

In one embodiment, the second information is used by the first node U2 to determine a second air interface resource pool, and the second air interface resource block belongs to the second air interface resource pool.

In one embodiment, the second information is used by the first node U2 to determine a first air interface resource pool and a second air interface resource pool, the first air interface resource block and the second air interface resource block belong to the first air interface resource pool and the second air interface resource pool respectively.

In one embodiment, the third information is used by the third node U3 to determine a first air interface resource pool, and the first air interface resource block belongs to the first air interface resource pool.

In one embodiment, the third information is used by the third node U3 to determine a second air interface resource pool, and the second air interface resource block belongs to the second air interface resource pool.

In one embodiment, the third information is used by the third node U3 to determine a first air interface resource pool and a second air interface resource pool, the first air interface resource block and the second air interface resource block belong to the first air interface resource pool and the second air interface resource pool respectively.

In one embodiment, the first signaling is transmitted on a downlink physical layer control channel (that is, a downlink channel capable of carrying physical layer signalings only).

In one embodiment, the first signaling is transmitted on a Physical Downlink Control Channel (PDCCH).

In one embodiment, the first signaling is transmitted on a downlink physical layer data channel (that is, a downlink channel capable of carrying physical layer data).

In one embodiment, the first signaling is transmitted on a Physical Downlink Shared Channel (PDSCH).

In one embodiment, the first bit block set is transmitted on a sidelink physical layer data channel (that is, a sidelink channel capable of carrying physical layer data).

In one embodiment, the first bit block set is transmitted on a PSSCH.

In one embodiment, the second signal is transmitted on a sidelink physical layer feedback channel (that is, a sidelink channel capable of carrying physical layer HARQ feedbacks only).

In one embodiment, the second signal is transmitted on a PSFCH.

In one embodiment, the second signal is transmitted on a sidelink physical layer data channel (that is, a sidelink channel capable of carrying physical layer data).

In one embodiment, the second signal is transmitted on a PSSCH.

In one embodiment, the third signal is transmitted on an uplink physical layer control channel (that is, an uplink channel capable of carrying physical layer signalings only).

In one embodiment, the third signal is transmitted on a PUCCH.

In one embodiment, the third signal is transmitted on an uplink physical layer data channel (that is, an uplink channel capable of carrying physical layer data).

In one embodiment, the third signal is transmitted on a Physical Uplink Shared Channel (PUSCH).

In one embodiment, the second signaling is transmitted on a sidelink physical layer control channel (that is, a sidelink channel capable of carrying physical layer signalings only).

In one embodiment, the second signaling is transmitted on a Physical Sidelink Control Channel (PSCCH).

In one embodiment, the second information is transmitted on a downlink physical layer data channel (that is, a downlink channel capable of carrying physical layer data).

In one embodiment, the second information is transmitted on a PDSCH.

In one embodiment, the third information is carried on a sidelink physical layer data channel (that is, a sidelink channel capable of carrying physical layer data).

In one embodiment, the third information is carried on a PSSCH.

In one embodiment, the third information is carried on a Physical Sidelink Broadcast Channel (PSBCH).

Embodiment 6

Figure 6:
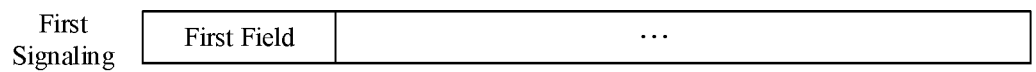
FIG. 6 is a diagram illustrating a first signaling according to one embodiment of the disclosure.

Embodiment 6 illustrates a diagram of a first signaling according to one embodiment of the disclosure, as shown in FIG. 6. In Embodiment 6, the first signaling includes the first field in the disclosure, and the first field in the first signaling indicates the first time interval in the disclosure.

In one embodiment, the first signaling is a physical layer signaling.

In one embodiment, the first signaling is a dynamic signaling.

In one embodiment, the first signaling is a Layer 1 (L1) signaling.

In one embodiment, the first signaling is a Layer 1 (L1) control signaling.

In one embodiment, the first signaling includes Downlink Control Information (DCI).

In one embodiment, the first signaling includes one or more fields in one DCI.

In one embodiment, the first signaling includes information in one or more fields in one Sidelink Control Information (SCI).

In one embodiment, the first signaling includes a DCI for uplink grant.

In one embodiment, the first signaling includes a DCI for Configured UL grant.

In one embodiment, the first signaling includes a DCI for Configured UL grant activation.

In one embodiment, the first signaling includes a DCI for Configured UL grant Type 2 activation.

In one embodiment, the first signaling is UE specific.

In one embodiment, the first signaling is a higher layer signaling.

In one embodiment, the first signaling is a Radio Resource Control (RRC) signaling.

In one embodiment, the first signaling is a Medium Access Control layer Control Element (MAC CE) signaling.

In one embodiment, the first signaling includes information in partial or all fields in one Information Element (IE).

In one embodiment, the first signaling indicates a Modulation and Coding Scheme (MCS) of a radio signal carrying the first bit block set.

In one embodiment, the first signaling indicates DeModulation Reference Signal (DMRS) configuration information of a radio signal carrying the first bit block set.

In one embodiment, the first signaling includes scheduling information of the first bit block set.

In one embodiment, the DMRS configuration information includes one or more of a port, occupied time domain resources, occupied frequency domain resources, occupied code domain resources, an RS sequence, a mapping mode, a DMRS type, a cyclic shift or an Orthogonal Cover Code (OCC) of the DMRS.

In one embodiment, the first signaling is used for determining the second air interface resource block.

In one embodiment, the first signaling indicates explicitly the second air interface resource block.

In one embodiment, the first signaling indicates implicitly the second air interface resource block.

In one embodiment, the first signaling is used for determining the third air interface resource block.

In one embodiment, the first signaling indicates explicitly the third air interface resource block.

In one embodiment, the first signaling indicates implicitly the third air interface resource block.

In one embodiment, the first signaling indicates an identifier of the third air interface resource block.

In one embodiment, an identifier of the third air interface resource block includes an identifier of PUCCH resources.

In one embodiment, an identifier of the third air interface resource block includes a PUCCH-Resource ID.

In one embodiment, the first field in the first signaling includes a positive integer number of bits.

In one embodiment, the first field in the first signaling includes one bit.

In one embodiment, the first field in the first signaling includes two bits.

In one embodiment, the first field in the first signaling includes three bits.

In one embodiment, the first field in the first signaling indicates explicitly the first time interval.

In one embodiment, the first time interval is one of P1 candidate time intervals, the first field in the first signaling indicates the first time interval from the P1 candidate time intervals, and the P1 is a positive integer greater than 1.

In one subembodiment, the P1 candidate time intervals are predefined.

In one subembodiment, the P1 candidate time intervals are configured by a higher layer signaling.

In one subembodiment, the P1 candidate time intervals are configured by an RRC signaling.

In one subembodiment, the P1 candidate time intervals are related to the first air interface resource block.

In one subembodiment, the first air interface resource block is used for determining the P1 candidate time intervals.

In one subembodiment, the first air interface resource pool is one of P candidate resource pools, and the P is a positive integer greater than 1; the P candidate resource pools correspond to P candidate time interval groups, the P candidate time interval groups include a first candidate time interval group and a second candidate time interval group, and one time interval in the first candidate time interval group does not belong to the second candidate time interval group; one of the P candidate time interval groups that is corresponding to the first air interface resource pool consists of P1 candidate time intervals. In one embodiment, the first signaling includes a second field; the first field and the second field in the first signaling together indicate the third air interface resource block.

In one subembodiment, the second field in the first signaling includes partial or all information in a PUCCH resource indicator field.

In one subembodiment, the second field in the first signaling includes a positive integer number of bits.

In one subembodiment, the first field and the second field in the first signaling together indicate time domain resources occupied by the third air interface resource block.

In one subembodiment, the first field in the first signaling indicates the time unit to which the third air interface resource block belongs; and the second field in the first signaling indicates multicarrier symbols occupied by the third air interface resource block in the time unit to which it belongs.

In one subembodiment, the second field in the first signaling indicates frequency domain resources occupied by the third air interface resource block.

In one subembodiment, the second field in the first signaling indicates frequency domain resources and code domain resources occupied by the third air interface resource block.

In one embodiment, the specific definition of the PUCCH resource indicator field can refer to 3 GPP T S38.212.

Embodiment 7

Figure 7:
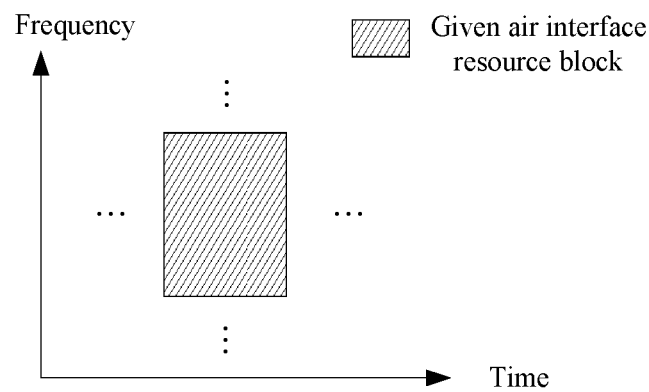
FIG. 7 is a diagram illustrating a given air interface resource block according to one embodiment of the disclosure.

Embodiment 7 illustrates a diagram of a given air interface resource block according to one embodiment of the disclosure, as shown in FIG. 7. In Embodiment 7, the given air interface resource block is any one of the first air interface resource block, the second air interface resource block, the third air interface resource block, the K first-type air interface resource blocks, the K second-type air interface resource blocks and K third-type air interface resource blocks in the disclosure.

In one embodiment, the given air interface resource block is the first air interface resource block.

In one embodiment, the given air interface resource block is the second air interface resource block.

In one embodiment, the given air interface resource block is the third air interface resource block.

In one embodiment, the given air interface resource block is any one of the K first-type air interface resource blocks.

In one embodiment, the given air interface resource block is any one of the K second-type air interface resource blocks.

In one embodiment, the given air interface resource block is any one of the K third-type air interface resource blocks.

In one embodiment, the given air interface resource block includes a positive integer number of Resource Elements (REs) in time-frequency domain.

In one embodiment, one RE occupies one multicarrier symbol in time domain and occupies one subcarrier in frequency domain.

In one embodiment, the multicarrier symbol is an Orthogonal Frequency Division Multiplexing (OFDM) symbol.

In one embodiment, the multicarrier symbol is a Single Carrier-Frequency Division Multiple Access (SC-FDMA) symbol.

In one embodiment, the multicarrier symbol is a Discrete Fourier Transform Spread OFDM (DFT-S-OFDM) symbol.

In one embodiment, the given air interface resource block includes a positive integer number of subcarriers in frequency domain.

In one embodiment, the given air interface resource block includes a positive integer number of Resource Blocks (RBs) in frequency domain.

In one embodiment, the given air interface resource block includes a positive integer number of subchannels in frequency domain.

In one embodiment, the given air interface resource block includes a positive integer number of multicarrier symbols in time domain.

In one embodiment, the given air interface resource block includes a positive integer number of inconsecutive multicarrier symbols in time domain.

In one embodiment, the given air interface resource block includes a positive integer number of consecutive multicarrier symbols in time domain.

In one embodiment, the given air interface resource block includes a positive integer number of slots in time domain.

In one embodiment, the given air interface resource block includes a positive integer number of sub-frames in time domain.

In one embodiment, the first air interface resource block includes time domain resources and frequency domain resources.

In one embodiment, the first air interface resource block includes time domain resources, frequency domain resources and code domain resources.

In one embodiment, the second air interface resource block includes time domain resources and frequency domain resources.

In one embodiment, the second air interface resource block includes time domain resources, frequency domain resources and code domain resources.

In one embodiment, the third air interface resource block includes time domain resources and frequency domain resources.

In one embodiment, the third air interface resource block includes time domain resources, frequency domain resources and code domain resources.

In one embodiment, any one of the K first-type air interface resource blocks includes time domain resources and frequency domain resources.

In one embodiment, any one of the K first-type air interface resource blocks includes time domain resources, frequency domain resources and code domain resources.

In one embodiment, any one of the K second-type air interface resource blocks includes time domain resources and frequency domain resources.

In one embodiment, any one of the K second-type air interface resource blocks includes time domain resources, frequency domain resources and code domain resources.

In one embodiment, any one of the K third-type air interface resource blocks includes time domain resources and frequency domain resources.

In one embodiment, any one of the K third-type air interface resource blocks includes time domain resources, frequency domain resources and code domain resources.

In one embodiment, code domain resources include one or more of a pseudo-random sequence, a low-PARP sequence, a cyclic shift, an OCC, an orthogonal sequence, a frequency domain orthogonal sequence and a time domain orthogonal sequence.

In one embodiment, the second air interface resource block is later than the first air interface resource block in time domain, and the third air interface resource block is later than the second air interface resource block in time domain.

In one embodiment, the third air interface resource block includes PUCCH resources.

In one embodiment, the third air interface resource block is one PUCCH resource.

In one embodiment, the third air interface resource block includes a PUCCH resource set.

In one embodiment, any one of the K third-type air interface resource blocks includes PUCCH resources.

In one embodiment, the K first-type air interface resource blocks are distributed at equal intervals in time domain.

In one embodiment, the K first-type air interface resource blocks are not distributed at equal intervals in time domain.

In one embodiment, any two of the K first-type air interface resource blocks occupy same frequency domain resources.

In one embodiment, the K second-type air interface resource blocks are distributed at equal intervals in time domain.

In one embodiment, the K second-type air interface resource blocks are not distributed at equal intervals in time domain.

In one embodiment, the K third-type air interface resource blocks are distributed at equal intervals in time domain.

In one embodiment, the K third-type air interface resource blocks are not distributed at equal intervals in time domain.

In one embodiment, any two of the K third-type air interface resource blocks occupy same frequency domain resources.

In one embodiment, any two of the K third-type air interface resource blocks occupy same frequency domain resources and same code domain resources.

Embodiment 8

Figure 8:
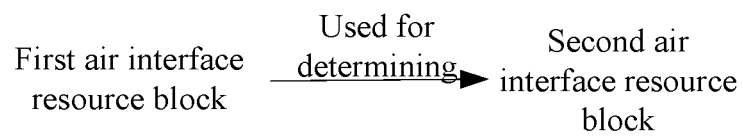
FIG. 8 is a diagram illustrating a case in which a first air interface resource block is used for determining a second air interface resource block according to one embodiment of the disclosure.

Embodiment 8 illustrates a diagram of a case in which a first air interface resource block is used for determining a second air interface resource block according to one embodiment of the disclosure, as shown in FIG. 8. In Embodiment 8, time-frequency resources occupied by the first air interface resource block are used for determining the second air interface resource block.

In one embodiment, time domain resources occupied by the first air interface resource block are used for determining time domain resources occupied by the second air interface resource block.

In one embodiment, a time interval between the time unit to which the second air interface resource block belongs and the time unit to which the first air interface resource block belongs is not less than a second time interval.

In one subembodiment, the second time interval is a positive integer.

In one subembodiment, the second time interval is a non-negative integer.

In one subembodiment, the second time interval is in unit of slot.

In one sub embodiment, the second time interval is in unit of a positive integer number of multicarrier symbols.

In one subembodiment, the second time interval is pre-configured.

In one subembodiment, the second time interval is configured through an RRC signaling.

In one subembodiment, the second information in the disclosure indicates the second time interval.

In one subembodiment, the third information in the disclosure indicates the second time interval.

In one embodiment, frequency domain resources occupied by the first air interface resource block are used for determining frequency domain resources occupied by the second air interface resource block.

In one embodiment, frequency domain resources occupied by the first air interface resource block are used for determining frequency domain resources and code domain resources occupied by the second air interface resource block.

In one embodiment, frequency domain resources occupied by the second air interface resource block are not related to time domain resources occupied by the first air interface resource block.

In one embodiment, frequency domain resources and code domain resources occupied by the second air interface resource block are not related to time domain resources occupied by the first air interface resource block.

In one embodiment, time-frequency resources occupied by the first air interface resource block are used for determining frequency domain resources occupied by the second air interface resource block.

In one embodiment, time-frequency resources occupied by the first air interface resource block are used for determining frequency domain resources and code domain resources occupied by the second air interface resource block.

In one embodiment, a lowest sub-channel occupied by the first air interface resource block belongs to M1 candidate sub-channels, the second air interface resource block belongs to M2 candidate air interface resource blocks, the M1 and the M2 are both positive integers greater than 1; any one of the M1 candidate sub-channels is corresponding to one of the M2 candidate air interface resource blocks; the second air interface resource block is one of the M2 candidate air interface resource blocks that is corresponding to the lowest sub-channel occupied by the first air interface resource block.

In one subembodiment, the M2 candidate air interface resource blocks are a subset of M3 candidate air interface resource blocks, and the M3 is a positive integer greater than the M2; time domain resources occupied by the first air interface resource block are used for determining the M2 candidate air interface resource blocks from the M3 candidate air interface resource blocks.

Embodiment 9

Figure 9:
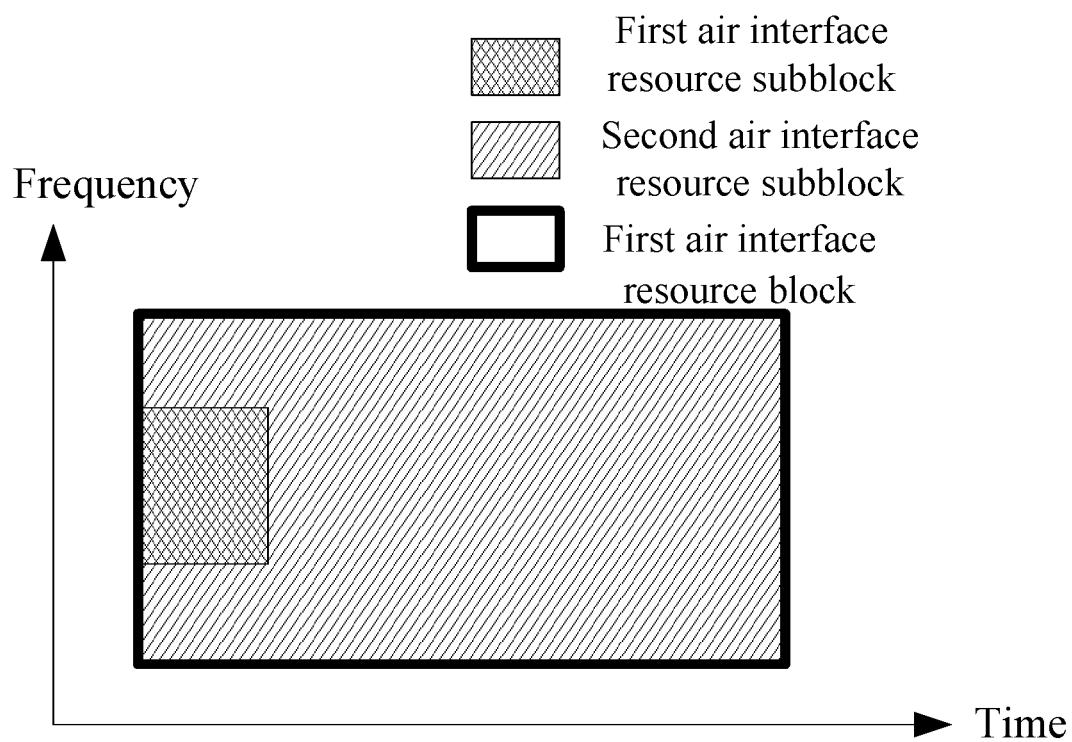
FIG. 9 is a diagram illustrating a first air interface resource subblock and a first air interface resource block according to one embodiment of the disclosure.

Embodiment 9 illustrates a diagram of a first air interface resource subblock and a first air interface resource block according to one embodiment of the disclosure, as shown in FIG. 9. In Embodiment 9, the first air interface resource subblock is one subset of the first air interface resource block; the first node in the disclosure transmits the second signaling in the disclosure in the first air interface resource subblock; the second signaling includes scheduling information of the first bit block set in the disclosure. A second air interface resource subblock is composed of all REs in the first air interface resource block that do not belong to the first air interface resource subblock. In FIG. 9, a bold-line box represents the first air interface resource block, a box filled with cross lines represents the first air interface resource subblock, and a box filled with left slashes represents the second air interface resource subblock.

In one embodiment, the first air interface resource block includes the first air interface resource subblock.

In one embodiment, the first air interface resource subblock includes a positive integer number of REs in time-frequency domain.

In one embodiment, time domain resources occupied by the first air interface resource subblock are a subset of time domain resources occupied by the second air interface resource subblock.

In one embodiment, frequency domain resources occupied by the first air interface resource subblock are a subset of frequency domain resources occupied by the second air interface resource subblock.

In one embodiment, the first air interface resource subblock and the second air interface resource subblock belong to one same time unit in time domain.

In one embodiment, the first signaling in the disclosure indicates the first air interface resource subblock.

In one embodiment, the second signaling is unicast transmitted.

In one embodiment, the second signaling is groupcast transmitted.

In one embodiment, the second signaling is a dynamic signaling.

In one embodiment, the second signaling is an L1 signaling.

In one embodiment, the second signaling includes an SCI.

In one embodiment, the second signaling includes one or more fields in one SCI.

In one embodiment, the second signaling is transmitted on a sidelink.

In one embodiment, the second signaling is transmitted through a PC5 interface.

In one embodiment, the scheduling information of the first bit block set includes one or more of occupied time domain resources, occupied frequency domain resources, an MCS, a DMRS configuration information, a HARQ process number, a Redundancy Version (RV) or a New Data Indicator (NDI) of a radio signal carrying the first bit block set.

In one embodiment, time-frequency resources occupied by the first air interface resource subblock are used for determining the second air interface resource block.

In one embodiment, time domain resources occupied by the first air interface resource subblock are used for determining time domain resources occupied by the second air interface resource block.

In one embodiment, frequency domain resources occupied by the first air interface resource subblock are used for determining frequency domain resources occupied by the second air interface resource block.

In one embodiment, frequency domain resources occupied by the first air interface resource subblock are used for determining frequency domain resources and code domain resources occupied by the second air interface resource block.

In one embodiment, time-frequency resources occupied by the first air interface resource subblock are used for determining frequency domain resources occupied by the second air interface resource block.

In one embodiment, time-frequency resources occupied by the first air interface resource subblock are used for determining frequency domain resources and code domain resources occupied by the second air interface resource block.

Embodiment 10

Figure 10:
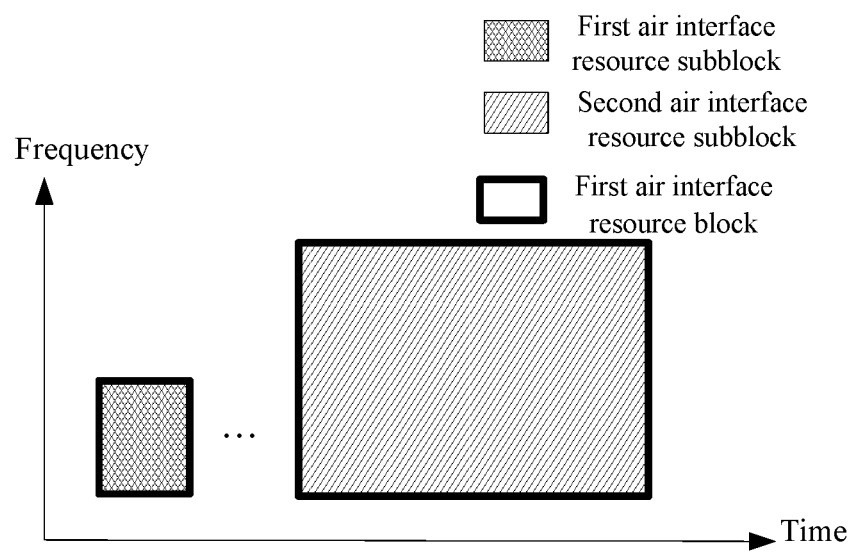
FIG. 10 is a diagram illustrating a first air interface resource subblock and a first air interface resource block according to one embodiment of the disclosure.

Embodiment 10 illustrates a diagram of a first air interface resource subblock and a first air interface resource block according to one embodiment of the disclosure, as shown in FIG. 10. In Embodiment 10, the first air interface resource subblock is one subset of the first air interface resource block; a second air interface resource subblock is composed of all REs in the first air interface resource block that do not belong to the first air interface resource subblock. In FIG. 10, a bold-line box belongs to the first air interface resource block, a box filled with cross lines represents the first air interface resource subblock, and a box filled with left slashes represents the second air interface resource subblock.

In one embodiment, the second air interface resource subblock and the first air interface resource subblock are orthogonal to each time in time domain.

In one embodiment, the first air interface resource subblock and the second air interface resource subblock belong to different time units in time domain.

Embodiment 11

Figure 11:
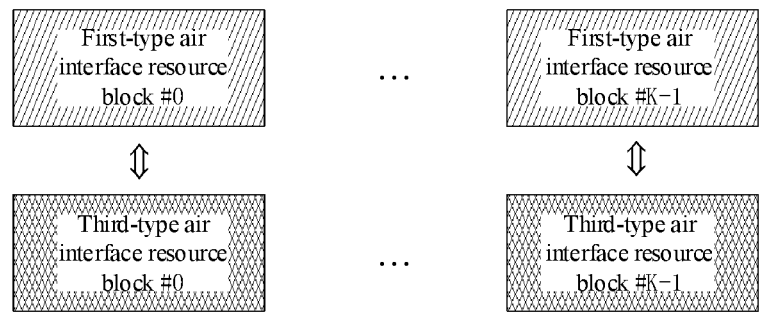
FIG. 11 is a diagram illustrating K first-type air interface resource blocks and K third-type air interface resource blocks according to one embodiment of the disclosure.

Embodiment 11 illustrates a diagram of K first-type air interface resource blocks and K third-type air interface resource blocks according to one embodiment of the disclosure, as shown in FIG. 11. In Embodiment 11, the first signaling in the disclosure is used for determining the K first-type air interface resource blocks and K third-type air interface resource blocks; the K third-type air interface resource blocks are reserved for HARQ-ACKs corresponding to bit block sets transmitted in the K first-type air interface resource blocks respectively; the first air interface resource block in the disclosure is one of the K first-type air interface resource blocks.

In one embodiment, the third air interface resource block in the disclosure is one of the K third-type air interface resource blocks that is corresponding to the first air interface resource block.

In one embodiment, a third-type air interface resource block corresponding to the first air interface resource block and the third air interface resource block in the disclosure belong to one same slot.

In one embodiment, a third-type air interface resource block corresponding to the first air interface resource block and the third air interface resource block in the disclosure belong to one same subframe.

In one embodiment, a third-type air interface resource block corresponding to the first air interface resource block and the third air interface resource block in the disclosure belong to one same time unit.

In one embodiment, the first node in the disclosure determines the first air interface resource block from the K first-type air interface resource blocks autonomously.

In one embodiment, the first node in the disclosure determines the first air interface resource block from the K first-type air interface resource blocks autonomously according to the time when the first bit block set in the disclosure reaches the physical layer.

In one subembodiment, a start time of the first air interface resource block is not earlier than the time when the first bit block set in the disclosure reaches the physical layer.

In one embodiment, the first signaling indicates explicitly the K first-type air interface resource blocks.

In one embodiment, the first signaling indicates implicitly the K first-type air interface resource blocks.

In one embodiment, the first signaling indicates explicitly the K third-type air interface resource blocks.

In one embodiment, the first signaling indicates implicitly the K third-type air interface resource blocks.

In one embodiment, a third signaling and the first signaling together indicate the K first-type air interface resource blocks, and the third signaling is an RRC signaling.

In one subembodiment, the third signaling indicates a time interval between any two adjacent first-type air interface resource blocks among the K first-type air interface resource blocks, and the first signaling indicates time domain resources occupied by an earliest first-type air interface resource block among the K first-type air interface resource blocks.

In one embodiment, the first signaling indicates frequency domain resources occupied by the K first-type air interface resource blocks.

In one embodiment, time-frequency resources occupied by any one of the K first-type air interface resource blocks and the first time interval in the disclosure are used for determining a corresponding third-type air interface resource.

In one embodiment, time-frequency resources occupied by any one of the K first-type air interface resource blocks and the first time interval in the disclosure are used for determining a time unit to which a corresponding third-type air interface resource belongs, and the first signaling indicates time domain resources occupied by each one of the K third-type air interface resource blocks in the time unit to which it belongs.

In one embodiment, the first signaling indicates frequency domain resources occupied by the K third-type air interface resource blocks.

In one embodiment, the first signaling indicates frequency domain resources and code domain resources occupied by the K third-type air interface resource blocks.

In one embodiment, any one of the K third-type air interface resource blocks is reserved for a HARQ-ACK corresponding to a bit block set transmitted in a corresponding first-type air interface resource block.

In one embodiment, any one of the K third-type air interface resource blocks is reserved for the first node to transmit a HARQ-ACK corresponding to a bit block set transmitted in a corresponding first-type air interface resource block.

In one embodiment, the HARQ-ACK corresponding to any one given bit block set includes an ACK.

In one embodiment, the HARQ-ACK corresponding to any one given bit block set includes a Negative Acknowledgement (NACK).

In one embodiment, the HARQ-ACK corresponding to any one given bit block set indicates whether each bit block in the given bit block set is correctly received.

In one embodiment, any one of the bit block sets transmitted in the K first-type air interface resource blocks includes a positive integer number of bit blocks, an any one of the positive integer number of bit blocks includes a positive integer number of binary bits.

In one embodiment, any one bit block included in any one of the bit block sets transmitted in the K first-type air interface resource blocks is one TB or one CBG In one embodiment, the HARQ-ACK transmitted in any one of the K third-type air interface resource blocks is transmitted on a PUCCH.

In one embodiment, the HARQ-ACK transmitted in any one of the K third-type air interface resource blocks is transmitted on an uplink.

Embodiment 12

Figure 12:
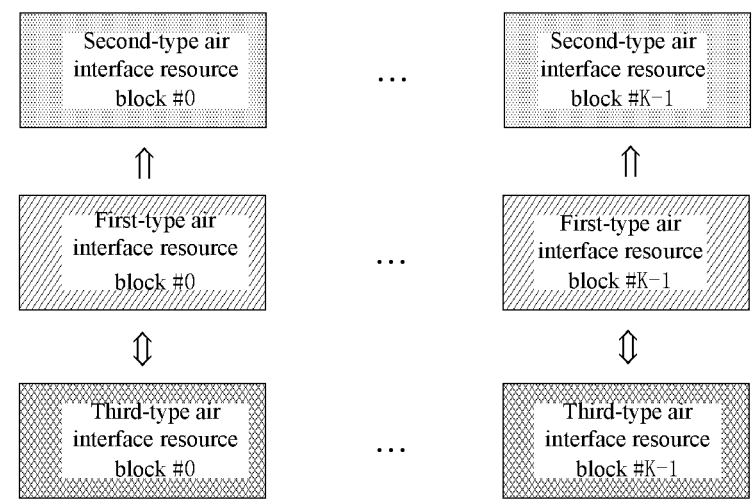
FIG. 12 is a diagram illustrating K first-type air interface resource blocks, K second-type air interface resource blocks and K third-type air interface resource blocks according to one embodiment of the disclosure.

Embodiment 12 illustrates K first-type air interface resource blocks, K second-type air interface resource blocks and K third-type air interface resource blocks according to one embodiment of the disclosure, as shown FIG. 12. In Embodiment 12, the K first-type air interface resource blocks are used for determining the K second-type air interface resource blocks respectively, the K third-type air interface resource blocks are reserved for HARQ-ACKs corresponding to bit block sets transmitted in the K first-type air interface resource blocks respectively. The reference first-type air interface resource block in the disclosure is any one of the K first-type air interface resource blocks; a time interval between the time unit to which a third-type air interface resource block corresponding to the reference first-type air interface resource block belongs and a time unit to which a second-type air interface resource block corresponding to the reference first-type air interface resource block belongs is the first time interval in the disclosure.

In one embodiment, time-frequency resources occupied by any one of the K first-type air interface resource blocks are used for determining a corresponding second-type air interface resource block.

In one embodiment, time domain resources occupied by any one of the K first-type air interface resource blocks are used for determining time domain resources occupied by a corresponding second-type air interface resource block.

In one embodiment, frequency domain resources occupied by any one of the K first-type air interface resource blocks are used for determining frequency domain resources occupied by a corresponding second-type air interface resource block.

In one embodiment, frequency domain resources occupied by any one of the K first-type air interface resource blocks are used for determining frequency domain resources and code domain resources occupied by a corresponding second-type air interface resource block.

In one embodiment, time-frequency resources occupied by any one of the K first-type air interface resource blocks are used for determining frequency domain resources occupied by a corresponding second-type air interface resource block.

In one embodiment, time-frequency resources occupied by any one of the K first-type air interface resource blocks are used for determining frequency domain resources and code domain resources occupied by a corresponding second-type air interface resource block.

In one embodiment, when the first node in the disclosure transmits the reference bit block set in the disclosure in the reference first-type air interface resource block, the first node transmits the HARQ-ACK corresponding to the reference bit block set in a corresponding third-type air interface resource block.

In one embodiment, when the first node in the disclosure gives up transmitting a radio signal in the reference first-type air interface resource block, the first node gives up transmitting a radio signal in a corresponding third-type air interface resource block.

In one embodiment, when the first node in the disclosure gives up transmitting a radio signal in the reference first-type air interface resource block, the first node transmits an ACK in a corresponding third-type air interface resource block.

In one embodiment, the reference bit block set in the disclosure is transmitted on a PSSCH, the HARQ-ACK corresponding to the reference bit block set is transmitted on a PSFCH in a corresponding second-type air interface resource block, and the HARQ-ACK corresponding to the reference bit block set is transmitted on a PUCCH in a corresponding third-type air interface resource block.

In one embodiment, the reference bit block set in the disclosure is transmitted on a sidelink, the HARQ-ACK corresponding to the reference bit block set is transmitted on a sidelink in a corresponding second-type air interface resource block, and the HARQ-ACK corresponding to the reference bit block set is transmitted on an uplink in a corresponding third-type air interface resource block.

In one embodiment, the reference bit block set includes a positive integer number of bit blocks, and any one of the positive integer number of bit blocks includes a positive integer number of binary bits.

In one embodiment, any one bit block included in the reference bit block set is one TB or one CBG Embodiment 13

Figure 13:
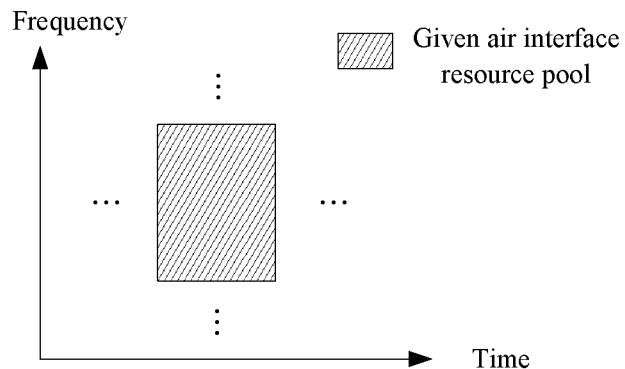
FIG. 13 is a diagram illustrating a given air interface resource pool according to one embodiment of the disclosure.

Embodiment 13 illustrates a diagram of a given air interface resource pool according to one embodiment of the disclosure, as shown in FIG. 13. In Embodiment 13, the given air interface resource pool is any one of the first air interface resource pool and the second air interface resource pool in the disclosure.

In one embodiment, the given air interface resource pool is the first air interface resource pool.

In one embodiment, the given air interface resource pool is the second air interface resource pool.

In one embodiment, the given air interface resource pool includes a positive integer number of REs in time-frequency domain.

In one embodiment, the given air interface resource pool includes a positive integer number of multicarrier symbols in time domain.

In one embodiment, the given air interface resource pool includes a positive integer number of slots in time domain.

In one embodiment, the given air interface resource pool includes a positive integer number of subcarriers in frequency domain.

In one embodiment, the given air interface resource pool includes a positive integer number of sub-channels in frequency domain.

In one embodiment, the given air interface resource pool appears multiple times in time domain.

In one embodiment, the given air interface resource pool appears only once in time domain.

In one embodiment, the first air interface resource pool includes time domain resources and frequency domain resources.

In one embodiment, the second air interface resource pool includes time domain resources and frequency domain resources.

In one embodiment, the second air interface resource pool includes time domain resources, frequency domain resources and code domain resources.

In one embodiment, the second air interface resource block in the disclosure belongs to the first air interface resource pool.

In one embodiment, the second air interface resource pool is a subset of the first air interface resource pool.

In one embodiment, the K first-type air interface resource blocks in the disclosure all belong to the first air interface resource pool.

In one embodiment, the K second-type air interface resource blocks in the disclosure all belong to the first air interface resource pool.

In one embodiment, the K second-type air interface resource blocks in the disclosure all belong to the second air interface resource pool.

In one embodiment, the second air interface resource pool includes Q1 candidate air interface resource blocks, and the Q1 is a positive integer greater than 1; the second air interface resource block is an earliest candidate air interface resource block among the Q1 candidate air interface resource blocks which belongs to a time unit that has a time interval not less than the second time interval illustrated in Embodiment 8 to the time unit to which the first air interface resource block belongs.

In one subembodiment, the Q1 candidate air interface resource blocks are orthogonal to each other in time domain.

Embodiment 14

Figure 14:
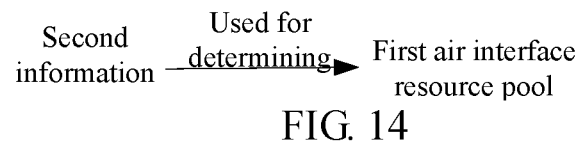
FIG. 14 is a diagram illustrating second information according to one embodiment of the disclosure.

Embodiment 14 illustrates a diagram of second information according to one embodiment of the disclosure, as shown in FIG. 14. In Embodiment 14, the second information is used for determining the first air interface resource pool in the disclosure.

In one embodiment, the second information indicates the first air interface resource pool.

In one embodiment, the second information is carried by an L1 signaling.

In one embodiment, the second information is carried by a higher layer signaling.

In one embodiment, the second information is carried by an RRC signaling.

In one embodiment, the second information includes information in partial or all fields in one IE.

In one embodiment, the second information includes information in one or more fields in a Master Information Block (MIB).

In one embodiment, the second information includes information in one or more fields in a System Information Block (SIB).

In one embodiment, the second information includes information in one or more fields in Remaining System Information (RMSI).

In one embodiment, the second information is transmitted through a Uu interface.

In one embodiment, the second information is transmitted through a downlink.

Embodiment 15

Figure 15:
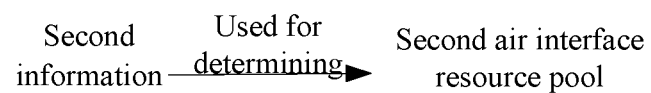
FIG. 15 is a diagram illustrating second information according to one embodiment of the disclosure.

Embodiment 15 illustrates a diagram of second information according to one embodiment of the disclosure, as shown in FIG. 15. In Embodiment 15, the second information is used for determining the second air interface resource pool in the disclosure.

In one embodiment, the second information indicates the second air interface resource pool.

Embodiment 16

Figure 16:
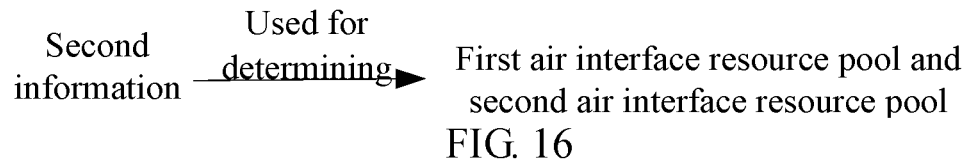
FIG. 16 is a diagram illustrating second information according to one embodiment of the disclosure.

Embodiment 16 illustrates a diagram of second information according to one embodiment of the disclosure, as shown in FIG. 16. In Embodiment 16, the second information is used for determining the first air interface resource pool and the second air interface resource pool in the disclosure.

In one embodiment, the second information indicates the first air interface resource pool and the second air interface resource pool.

In one embodiment, the second air interface resource pool is a subset of the first air interface resource pool, and the second information indicates the first air interface resource pool and indicates the second air interface resource pool from the first air interface resource pool.

Embodiment 17

Figure 17:
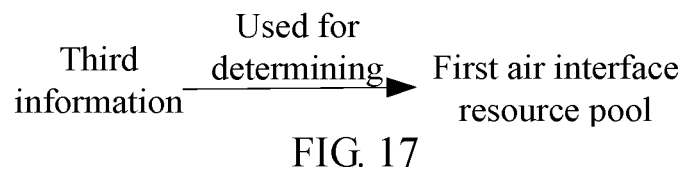
FIG. 17 is a diagram illustrating third information according to one embodiment of the disclosure.

Embodiment 17 illustrates a diagram of third information according to one embodiment of the disclosure, as shown in FIG. 17. In Embodiment 17, the third information is used for determining the first air interface resource pool in the disclosure.

In one embodiment, the third information indicates the first air interface resource pool.

In one embodiment, the third information is carried by an L1 signaling.

In one embodiment, the third information is carried by a higher layer signaling.

In one embodiment, the third information is carried by an RRC signaling.

In one embodiment, the third information is unicast transmitted.

In one embodiment, the third information is groupcast transmitted.

In one embodiment, the third information is broadcast transmitted.

In one embodiment, the third information includes information in partial or all fields in one IE.

In one embodiment, the third information includes information in one or more fields in an MIB.

In one embodiment, the third information includes information in one or more fields in an SIB.

In one embodiment, the third information includes information in one or more fields in an RMSI.

In one embodiment, the third information is transmitted on a sidelink.

In one embodiment, the third information is transmitted through a PC5 interface.

Embodiment 18

Figure 18:
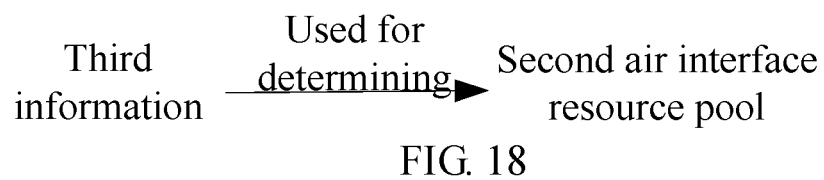
FIG. 18 is a diagram illustrating third information according to one embodiment of the disclosure.

Embodiment 18 illustrates a diagram of third information according to one embodiment of the disclosure, as shown in FIG. 18. In Embodiment 18, the third information is used for determining the second air interface resource pool in the disclosure.

In one embodiment, the third information indicates the second air interface resource pool.

Embodiment 19

Figure 19:
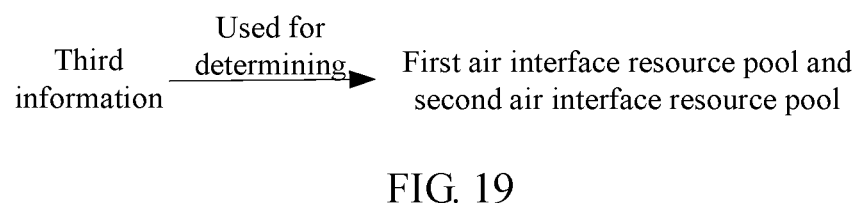
FIG. 19 is a diagram illustrating third information according to one embodiment of the disclosure.

Embodiment 19 illustrates a diagram of third information according to one embodiment of the disclosure, as shown in FIG. 19. In Embodiment 19, the third information is used for determining the first air interface resource pool and the second air interface resource pool in the disclosure.

In one embodiment, the third information indicates the first air interface resource pool and the second air interface resource pool.

In one embodiment, the second air interface resource pool is a subset of the first air interface resource pool; the third information indicates the first air interface resource pool and indicates the second air interface resource pool from the first air interface resource pool.

Embodiment 20

Figure 20:
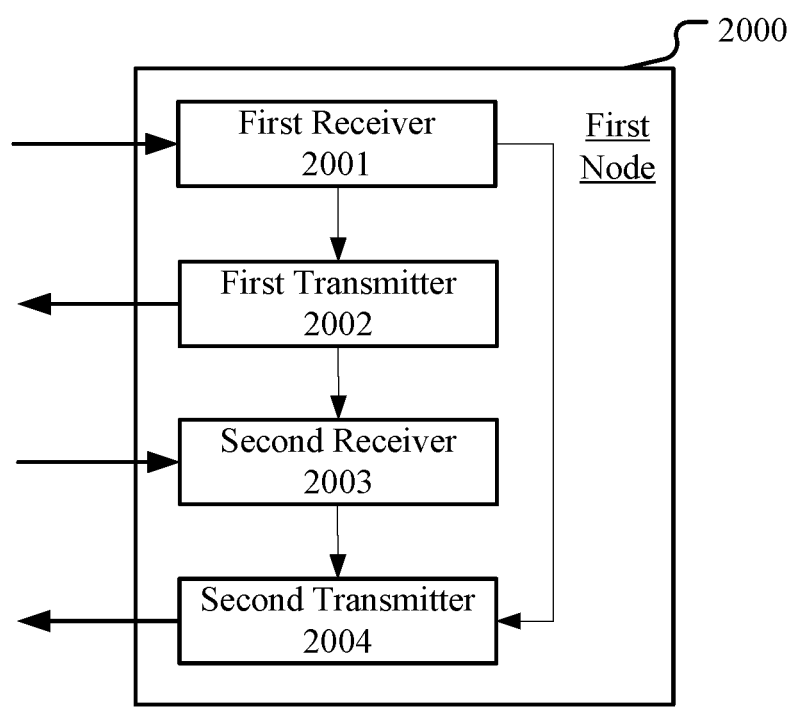
FIG. 20 is a structure block diagram illustrating a processing device in a first node according to one embodiment of the disclosure.

Embodiment 20 illustrates a structure block diagram of a processing device in a first node according to one embodiment of the disclosure, as shown in FIG. 20. In FIG. 20, the processing device 2000 in the first node includes a first receiver 2001, a first transmitter 2002, a second receiver 2003 and a second transmitter 2004.

In Embodiment 20, the first receiver 2001 receives a first signaling; the first transmitter 2002 transmits a first bit block set in a first air interface resource block; the second receiver 2003 receives a second signal in a second air interface resource block; and the second transmitter 2004 transmits a third signal in a third air interface resource block.

In Embodiment 20, the first signaling is used for determining the first air interface resource block, and the first air interface resource block is used for determining the second air interface resource block; the second signal indicates whether the first bit block set is correctly received; the second signal is used for determining the third signal, and the third signal indicates whether the first bit block set is correctly received; the first signaling indicates a first time interval, a time interval between a time unit to which the third air interface resource block belongs and a time unit to which the second air interface resource block belongs is the first time interval; and a transmitter of the first signaling is different from a transmitter of the second signal.

In one embodiment, the first signaling includes a first field, and the first field in the first signaling indicates the first time interval.

In one embodiment, the first transmitter 2002 transmits a second signaling in a first air interface resource subblock, wherein the first air interface resource subblock is a subset of the first air interface resource block, and the second signaling includes scheduling information of the first bit block set.

In one embodiment, the first signaling is used for determining K first-type air interface resource blocks and K third-type air interface resource blocks, the K is a positive integer greater than 1, the K third-type air interface resource blocks are reserved for HARQ-ACKs corresponding to bit block sets transmitted in the K first-type air interface resource blocks respectively, and the first air interface resource block is one of the K first-type air interface resource blocks In one embodiment, the K first-type air interface resource blocks are used for determining K second-type air interface resource blocks respectively, the second air interface resource block is one of the K second-type air interface resource blocks that is corresponding to the first air interface resource block, a reference first-type air interface resource block is any one of the K first-type air interface resource blocks, when the first node transmits one reference bit block set in the reference first-type air interface resource block, the first node receives a HARQ-ACK corresponding to the reference bit block set in a second-type air interface resource block corresponding to the reference first-type air interface resource block, and a time interval between a time unit to which a third-type air interface resource block corresponding to the reference first-type air interface resource block belongs and a time unit to which a second-type air interface resource block corresponding to the reference first-type air interface resource block belongs is the first time interval.

In one embodiment, the first receiver 2001 receives second information, wherein the second information is used for determining a first air interface resource pool, and the first air interface resource block belongs to the first air interface resource pool.

In one embodiment, the first receiver 2001 receives second information, wherein the second information is used for determining a second air interface resource pool, and the second air interface resource block belongs to the second air interface resource pool.

In one embodiment, the first receiver 2001 receives second information, wherein the second information is used for determining a first air interface resource pool and a second air interface resource pool, the first air interface resource block and the second air interface resource block belong to the first air interface resource pool and the second air interface resource pool respectively.

In one embodiment, the second transmitter 2004 transmits third information, wherein the third information is used for determining a first air interface resource pool, and the first air interface resource block belongs to the first air interface resource pool.

In one embodiment, the second transmitter 2004 transmits third information, wherein the third information is used for determining a second air interface resource pool, and the second air interface resource block belongs to the second air interface resource pool.

In one embodiment, the second transmitter 2004 transmits third information, wherein the third information is used for determining a first air interface resource pool and a second air interface resource pool, the first air interface resource block and the second air interface resource block belong to the first air interface resource pool and the second air interface resource pool respectively.

In one embodiment, the first node is a UE.

In one embodiment, the first node is a relay equipment.

In one embodiment, the first receiver 2001 includes at least one of the antenna 452, the receiver 454, the receiving processor 456, the multiantenna receiving processor 458, the controller/processor 459, the memory 460 or the data source 467 illustrated in Embodiment 4.

In one embodiment, the first transmitter 2002 includes at least one of the antenna 452, the transmitter 454, the transmitting processor 468, the multiantenna transmitting processor 457, the controller/processor 459, the memory 460 or the data source 467 illustrated in Embodiment 4.

In one embodiment, the second receiver 2003 includes at least one of the antenna 452, the receiver 454, the receiving processor 456, the multiantenna receiving processor 458, the controller/processor 459, the memory 460 or the data source 467 illustrated in Embodiment 4.

In one embodiment, the second transmitter 2004 includes at least one of the antenna 452, the transmitter 454, the transmitting processor 468, the multiantenna transmitting processor 457, the controller/processor 459, the memory 460 or the data source 467 illustrated in Embodiment 4.

Embodiment 21

Figure 21:
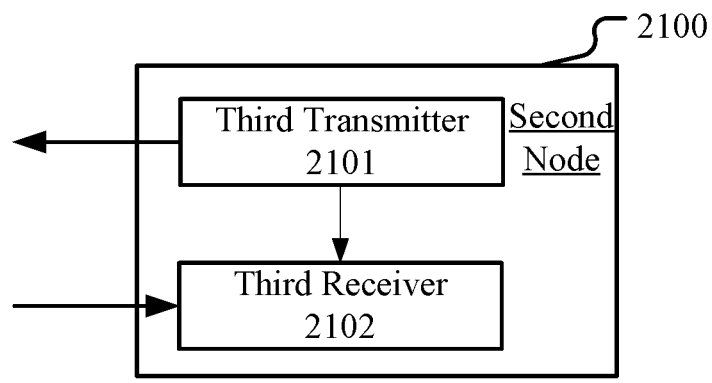
FIG. 21 is a structure block diagram illustrating a processing device in a second node according to one embodiment of the disclosure.

Embodiment 21 illustrates a structure block diagram of a processing device in a second node according to one embodiment of the disclosure, as shown in FIG. 21. In FIG. 21, the processing device 2100 in the second node includes a third transmitter 2101 and a third receiver 2102.

In Embodiment 21, the third transmitter 2101 transmits a first signaling; and the third receiver 2102 receives a third signal in a third air interface resource block.

In Embodiment 21, the first signaling is used for determining a first air interface resource block, and the first air interface resource block is used for determining a second air interface resource block; a transmitter of the third signal transmits a first bit block set in the first air interface resource block and receives a second signal in the second air interface resource block; the second signal indicates whether the first bit block set is correctly received; the second signal is used for determining the third signal, and the third signal indicates whether the first bit block set is correctly received; the first signaling indicates a first time interval, a time interval between a time unit to which the third air interface resource block belongs and a time unit to which the second air interface resource block belongs is the first time interval; and the second node is different from a transmitter of the second signal.

In one embodiment, the first signaling includes a first field, and the first field in the first signaling indicates the first time interval.

In one embodiment, the first signaling is used for determining K first-type air interface resource blocks and K third-type air interface resource blocks, the K is a positive integer greater than 1, the K third-type air interface resource blocks are reserved for HARQ-ACKs corresponding to bit block sets transmitted in the K first-type air interface resource blocks respectively, and the first air interface resource block is one of the K first-type air interface resource blocks.

In one embodiment, the K first-type air interface resource blocks are used for determining K second-type air interface resource blocks respectively, the second air interface resource block is one of the K second-type air interface resource blocks that is corresponding to the first air interface resource block, a reference first-type air interface resource block is any one of the K first-type air interface resource blocks, when the transmitter of the third signal transmits one reference bit block set in the reference first-type air interface resource block, the transmitter of the third signal receives a HARQ-ACK corresponding to the reference bit block set in a second-type air interface resource block corresponding to the reference first-type air interface resource block, and a time interval between a time unit to which a third-type air interface resource block corresponding to the reference first-type air interface resource block belongs and a time unit to which a second-type air interface resource block corresponding to the reference first-type air interface resource block belongs is the first time interval.

In one embodiment, the third transmitter 2101 transmits second information, wherein the second information is used for determining a first air interface resource pool, and the first air interface resource block belongs to the first air interface resource pool.

In one embodiment, the third transmitter 2101 transmits second information, wherein the second information is used for determining a second air interface resource pool, and the second air interface resource block belongs to the second air interface resource pool;

In one embodiment, the third transmitter 2101 transmits second information, wherein the second information is used for determining a first air interface resource pool and a second air interface resource pool, the first air interface resource block and the second air interface resource block belong to the first air interface resource pool and the second air interface resource pool respectively.

In one embodiment, the second node is a base station.

In one embodiment, the second node is a relay node.

In one embodiment, the third transmitter 2101 includes at least one of the antenna 420, the transmitter 418, the transmitting processor 416, the multiantenna transmitting processor 471, the controller/processor 475 or the memory 476 illustrated in Embodiment 4.

In one embodiment, the third receiver 2101 includes at least one of the antenna 420, the receiver 418, the receiving processor 470, the multiantenna receiving processor 472, the controller/processor 475 or the memory 476 illustrated in Embodiment 4.

Embodiment 22

Figure 22:
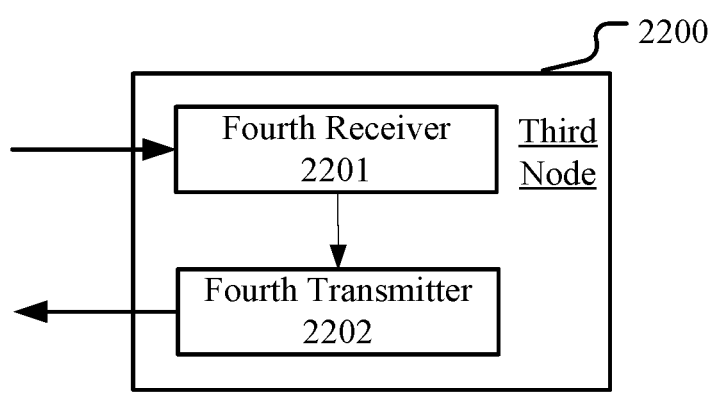
FIG. 22 is a structure block diagram illustrating a processing device in a third node according to one embodiment of the disclosure.

Embodiment 22 illustrates a structure block diagram of a processing device in a third node according to one embodiment of the disclosure, as shown in FIG. 22. In FIG. 22, the processing device 2200 in the third node includes a fourth receiver 2201 and a fourth transmitter 2202.

In Embodiment 22, the fourth receiver 2201 receives a first bit block set in a first air interface resource block; and the fourth transmitter 2202 transmits a second sub-signal in a second air interface resource block. Herein, the first air interface resource block is used for determining the second air interface resource block. The second sub-signal indicates whether the first bit block set is correctly received.

In one embodiment, the fourth receiver 2201 receives a second signaling in a first air interface resource subblock, the first air interface resource subblock is a subset of the first air interface resource block; and the second signaling includes scheduling information of the first bit block set.

In one embodiment, the fourth receiver 2201 receives third information; herein, the third information is used for determining a first air interface resource pool, and the first air interface resource block belongs to the first air interface resource pool.

In one embodiment, the fourth receiver 2201 receives third information; herein, the third information is used for determining a second air interface resource pool, and the second air interface resource block belongs to the second air interface resource pool.

In one embodiment, the fourth receiver 2201 receives third information; herein, the third information is used for determining a first air interface resource pool and a second air interface resource pool, the first air interface resource block and the second air interface resource block belong to the first air interface resource pool and the second air interface resource pool respectively.

In one embodiment, the third node is a UE.

In one embodiment, the third node is a relay node.

In one embodiment, the fourth receiver 2201 includes at least one of the antenna 420, the receiver 418, the receiving processor 470, the multiantenna receiving processor 472, the controller/processor 475 or the memory 476 illustrated in Embodiment 4.

In one embodiment, the fourth transmitter 2202 includes at least one of the antenna 420, the transmitter 418, the transmitting processor 416, the multiantenna transmitting processor 471, the controller/processor 475 or the memory 476 illustrated in Embodiment 4.

The ordinary skill in the art may understand that all or part steps in the above method may be implemented by instructing related hardware through a program. The program may be stored in a computer readable storage medium, for example Read-Only Memory (ROM), hard disk or compact disc, etc. Optionally, all or part steps in the above embodiments also may be implemented by one or more integrated circuits. Correspondingly, each module unit in the above embodiment may be realized in the form of hardware, or in the form of software function modules. The disclosure is not limited to any combination of hardware and software in specific forms. The UE and terminal in the disclosure include but not limited to unmanned aerial vehicles, communication modules on unmanned aerial vehicles, telecontrolled aircrafts, aircrafts, diminutive airplanes, mobile phones, tablet computers, notebooks, vehicle-mounted communication equipment, wireless sensor, network cards, terminals for Internet of Things, REID terminals, NB-IOT terminals, Machine Type Communication (MTC) terminals, enhanced MTC (eMTC) terminals, data cards, low-cost mobile phones, low-cost tablet computers, etc. The base station in the disclosure includes but not limited to macro-cellular base stations, micro-cellular base stations, home base stations, relay base station, gNBs (NR node B), Transmitter Receiver Points (TRPs) and radio communication equipment.

The above are merely the preferred embodiments of the disclosure and are not intended to limit the scope of protection of the disclosure. Any modification, equivalent substitute and improvement made within the spirit and principle of the disclosure are intended to be included within the scope of protection of the disclosure.

What is claimed is:

1. A first node for wireless communication, comprising:
a first receiver, to receive a first signaling;
a first transmitter, to transmit a first bit block set in a first air interface resource block;
a second receiver, to receive a second signal in a second air interface resource block; and
a second transmitter, to transmit a third signal in a third air interface resource block;
wherein the first signaling is used for determining the first air interface resource block, and the first air interface resource block is used for determining the second air interface resource block; the second signal indicates whether the first bit block set is correctly received; the second signal is used for determining the third signal, and the third signal indicates whether the first bit block set is correctly received; the first signaling indicates a first time interval, a time interval between a time unit to which the third air interface resource block belongs and a time unit to which the second air interface resource block belongs is the first time interval; and a transmitter of the first signaling is different from a transmitter of the second signal.

2. The first node according to claim 1, wherein the first signaling includes a first field, and the first field in the first signaling indicates the first time interval;
or, the first signaling includes a first field, the first field in the first signaling indicates the first time interval, the first time interval is one of P1 candidate time intervals, the first field in the first signaling indicates the first time interval from the P1 candidate time intervals, the P1 is a positive integer greater than 1, and the P1 candidate time intervals are related to the first air interface resource block.

3. The first node according to claim 1, wherein the first transmitter transmits a second signaling in a first air interface resource subblock, wherein the first air interface resource subblock is a subset of the first air interface resource block, and the second signaling includes scheduling information of the first bit block set;
or, the first receiver receives second information, wherein the second information is used for determining a first air interface resource pool, and the first air interface resource block belongs to the first air interface resource pool;
or, the first receiver receives second information, wherein the second information is used for determining a second air interface resource pool, and the second air interface resource block belongs to the second air interface resource pool;
or, the first receiver receives second information, wherein the second information is used for determining a first air interface resource pool and a second air interface resource pool, the first air interface resource block and the second air interface resource block belong to the first air interface resource pool and the second air interface resource pool respectively;
or, the second transmitter transmits third information, wherein the third information is used for determining a first air interface resource pool, and the first air interface resource block belongs to the first air interface resource pool;
or, the second transmitter transmits third information, wherein the third information is used for determining a second air interface resource pool, and the second air interface resource block belongs to the second air interface resource pool;
or, the second transmitter transmits third information, wherein the third information is used for determining a first air interface resource pool and a second air interface resource pool, the first air interface resource block and the second air interface resource block belong to the first air interface resource pool and the second air interface resource pool respectively.

4. The first node according to claim 1, wherein the first signaling is used for determining K first-type air interface resource blocks and K third-type air interface resource blocks, the K is a positive integer greater than 1, the K third-type air interface resource blocks are reserved for HARQ-ACKs corresponding to bit block sets transmitted in the K first-type air interface resource blocks respectively, and the first air interface resource block is one of the K first-type air interface resource blocks;
or, the first signaling is used for determining K first-type air interface resource blocks and K third-type air interface resource blocks, the K is a positive integer greater than 1, the K third-type air interface resource blocks are reserved for HARQ-ACKs corresponding to bit block sets transmitted in the K first-type air interface resource blocks respectively, the first air interface resource block is one of the K first-type air interface resource blocks, the K first-type air interface resource blocks are used for determining K second-type air interface resource blocks respectively, the second air interface resource block is one of the K second-type air interface resource blocks that is corresponding to the first air interface resource block, a reference first-type air interface resource block is any one of the K first-type air interface resource blocks, when the first node transmits one reference bit block set in the reference first-type air interface resource block, the first node receives a HARQ-ACK corresponding to the reference bit block set in a second-type air interface resource block corresponding to the reference first-type air interface resource block, and a time interval between a time unit to which a third-type air interface resource block corresponding to the reference first-type air interface resource block belongs and a time unit to which a second-type air interface resource block corresponding to the reference first-type air interface resource block belongs is the first time interval.

5. The first node according to claim 1, wherein the first time interval is a non-negative integer, and a unit of the first time interval is related to the first air interface resource block.

6. A second node for wireless communication, comprising:

a third transmitter, to transmit a first signaling; and
a third receiver, to receive a third signal in a third air interface resource block;
wherein the first signaling is used for determining a first air interface resource block, and the first air interface resource block is used for determining a second air interface resource block; a transmitter of the third signal transmits a first bit block set in the first air interface resource block and receives a second signal in the second air interface resource block; the second signal indicates whether the first bit block set is correctly received; the second signal is used for determining the third signal, and the third signal indicates whether the first bit block set is correctly received; the first signaling indicates a first time interval, a time interval between a time unit to which the third air interface resource block belongs and a time unit to which the second air interface resource block belongs is the first time interval; and the second node is different from a transmitter of the second signal.

7. The second node according to claim 6, wherein the first signaling includes a first field, and the first field in the first signaling indicates the first time interval;
or, the first signaling includes a first field, the first field in the first signaling indicates the first time interval, the first time interval is one of P1 candidate time intervals, the first field in the first signaling indicates the first time interval from the P1 candidate time intervals, the P1 is a positive integer greater than 1, and the P1 candidate time intervals are related to the first air interface resource block.

8. The second node according to claim 6, wherein the first signaling is used for determining K first-type air interface resource blocks and K third-type air interface resource blocks, the K is a positive integer greater than 1, the K third-type air interface resource blocks are reserved for HARQ-ACKs corresponding to bit block sets transmitted in the K first-type air interface resource blocks respectively, and the first air interface resource block is one of the K first-type air interface resource blocks;
or, the first signaling is used for determining K first-type air interface resource blocks and K third-type air interface resource blocks, the K is a positive integer greater than 1, the K third-type air interface resource blocks are reserved for HARQ-ACKs corresponding to bit block sets transmitted in the K first-type air interface resource blocks respectively, the first air interface resource block is one of the K first-type air interface resource blocks, the K first-type air interface resource blocks are used for determining K second-type air interface resource blocks respectively, the second air interface resource block is one of the K second-type air interface resource blocks that is corresponding to the first air interface resource block, a reference first-type air interface resource block is any one of the K first-type air interface resource blocks, when the transmitter of the third signal transmits one reference bit block set in the reference first-type air interface resource block, the transmitter of the third signal receives a HARQ-ACK corresponding to the reference bit block set in a second-type air interface resource block corresponding to the reference first-type air interface resource block, and a time interval between a time unit to which a third-type air interface resource block corresponding to the reference first-type air interface resource block belongs and a time unit to which a second-type air interface resource block corresponding to the reference first-type air interface resource block belongs is the first time interval.

9. The second node according to claim 6, wherein the third transmitter transmits second information, wherein the second information is used for determining a first air interface resource pool, and the first air interface resource block belongs to the first air interface resource pool;
or, the third transmitter transmits second information, wherein the second information is used for determining a second air interface resource pool, and the second air interface resource block belongs to the second air interface resource pool;
or, the third transmitter transmits second information, wherein the second information is used for determining a first air interface resource pool and a second air interface resource pool, the first air interface resource block and the second air interface resource block belong to the first air interface resource pool and the second air interface resource pool respectively.

10. The second node according to claim 6, wherein the first time interval is a non-negative integer, and a unit of the first time interval is related to the first air interface resource block.

11. A method in a first node for wireless communication, comprising:
receiving a first signaling;
transmitting a first bit block set in a first air interface resource block;
receiving a second signal in a second air interface resource block; and
transmitting a third signal in a third air interface resource block;
wherein the first signaling is used for determining the first air interface resource block, and the first air interface resource block is used for determining the second air interface resource block; the second signal indicates whether the first bit block set is correctly received; the second signal is used for determining the third signal, and the third signal indicates whether the first bit block set is correctly received; the first signaling indicates a first time interval, a time interval between a time unit to which the third air interface resource block belongs and a time unit to which the second air interface resource block belongs is the first time interval; and a transmitter of the first signaling is different from a transmitter of the second signal.

12. The method according to claim 11, wherein the first signaling includes a first field, and the first field in the first signaling indicates the first time interval;
or, the first signaling includes a first field, the first field in the first signaling indicates the first time interval, the first time interval is one of P1 candidate time intervals, the first field in the first signaling indicates the first time interval from the P1 candidate time intervals, the P1 is a positive integer greater than 1, and the P1 candidate time intervals are related to the first air interface resource block.

13. The method according to claim 11, comprising:
transmitting a second signaling in a first air interface resource subblock, wherein the first air interface resource subblock is a subset of the first air interface resource block, and the second signaling includes scheduling information of the first bit block set;
or, receiving second information, wherein the second information is used for determining a first air interface resource pool, and the first air interface resource block belongs to the first air interface resource pool;

or, receiving second information, wherein the second information is used for determining a second air interface resource pool, and the second air interface resource block belongs to the second air interface resource pool;

or, receiving second information, wherein the second information is used for determining a first air interface resource pool and a second air interface resource pool, the first air interface resource block and the second air interface resource block belong to the first air interface resource pool and the second air interface resource pool respectively;

or, transmitting third information, wherein the third information is used for determining a first air interface resource pool, and the first air interface resource block belongs to the first air interface resource pool;

or, transmitting third information, wherein the third information is used for determining a second air interface resource pool, and the second air interface resource block belongs to the second air interface resource pool;

or, transmitting third information, wherein the third information is used for determining a first air interface resource pool and a second air interface resource pool, the first air interface resource block and the second air interface resource block belong to the first air interface resource pool and the second air interface resource pool respectively.

14. The method according to claim 11, wherein the first signaling is used for determining K first-type air interface resource blocks and K third-type air interface resource blocks, the K is a positive integer greater than 1, the K third-type air interface resource blocks are reserved for HARQ-ACKs corresponding to bit block sets transmitted in the K first-type air interface resource blocks respectively, and the first air interface resource block is one of the K first-type air interface resource blocks;

or, the first signaling is used for determining K first-type air interface resource blocks and K third-type air interface resource blocks, the K is a positive integer greater than 1, the K third-type air interface resource blocks are reserved for HARQ-ACKs corresponding to bit block sets transmitted in the K first-type air interface resource blocks respectively, the first air interface resource block is one of the K first-type air interface resource blocks, the K first-type air interface resource blocks are used for determining K second-type air interface resource blocks respectively, the second air interface resource block is one of the K second-type air interface resource blocks that is corresponding to the first air interface resource block, a reference first-type air interface resource block is any one of the K first-type air interface resource blocks, when the first node transmits one reference bit block set in the reference first-type air interface resource block, the first node receives a HARQ-ACK corresponding to the reference bit block set in a second-type air interface resource block corresponding to the reference first-type air interface resource block, and a time interval between a time unit to which a third-type air interface resource block corresponding to the reference first-type air interface resource block belongs and a time unit to which a second-type air interface resource block corresponding to the reference first-type air interface resource block belongs is the first time interval.

15. The method according to claim 11, wherein the first time interval is a non-negative integer, and a unit of the first time interval is related to the first air interface resource block.

16. A method in a second node for wireless communication, comprising:
  transmitting a first signaling; and
  receiving a third signal in a third air interface resource block;
  wherein the first signaling is used for determining a first air interface resource block, and the first air interface resource block is used for determining a second air interface resource block; a transmitter of the third signal transmits a first bit block set in the first air interface resource block and receives a second signal in the second air interface resource block; the second signal indicates whether the first bit block set is correctly received; the second signal is used for determining the third signal, and the third signal indicates whether the first bit block set is correctly received; the first signaling indicates a first time interval, a time interval between a time unit to which the third air interface resource block belongs and a time unit to which the second air interface resource block belongs is the first time interval; and the second node is different from a transmitter of the second signal.

17. The method according to claim 16, wherein the first signaling includes a first field, and the first field in the first signaling indicates the first time interval;

or, the first signaling includes a first field, the first field in the first signaling indicates the first time interval, the first time interval is one of P1 candidate time intervals, the first field in the first signaling indicates the first time interval from the P1 candidate time intervals, the P1 is a positive integer greater than 1, and the P1 candidate time intervals are related to the first air interface resource block.

18. The method according to claim 16, wherein the first signaling is used for determining K first-type air interface resource blocks and K third-type air interface resource blocks, the K is a positive integer greater than 1, the K third-type air interface resource blocks are reserved for HARQ-ACKs corresponding to bit block sets transmitted in the K first-type air interface resource blocks respectively, and the first air interface resource block is one of the K first-type air interface resource blocks;

or, the first signaling is used for determining K first-type air interface resource blocks and K third-type air interface resource blocks, the K is a positive integer greater than 1, the K third-type air interface resource blocks are reserved for HARQ-ACKs corresponding to bit block sets transmitted in the K first-type air interface resource blocks respectively, the first air interface resource block is one of the K first-type air interface resource blocks, the K first-type air interface resource blocks are used for determining K second-type air interface resource blocks respectively, the second air interface resource block is one of the K second-type air interface resource blocks that is corresponding to the first air interface resource block, a reference first-type air interface resource block is any one of the K first-type air interface resource blocks, when the transmitter of the third signal transmits one reference bit block set in the reference first-type air interface resource block, the transmitter of the third signal receives a HARQ-ACK corresponding to the reference bit block set in a second-type air interface resource block corresponding to the reference first-type air interface resource block, and a time interval between a time unit to which a third-type air interface resource block corresponding to the reference first-type air interface resource block belongs and a time unit to which a second-type air interface resource block corresponding to the reference first-type air interface resource block belongs is the first time interval.

19. The method according to claim 16, comprising:
transmitting second information, wherein the second information is used for determining a first air interface resource pool, and the first air interface resource block belongs to the first air interface resource pool;

or, transmitting second information, wherein the second information is used for determining a second air interface resource pool, and the second air interface resource block belongs to the second air interface resource pool;

or, transmitting second information, wherein the second information is used for determining a first air interface resource pool and a second air interface resource pool, the first air interface resource block and the second air interface resource block belong to the first air interface resource pool and the second air interface resource pool respectively.

20. The method according to claim 16, wherein the first time interval is a non-negative integer, and a unit of the first time interval is related to the first air interface resource block.

* * * * *